(12) United States Patent
Ray et al.

(10) Patent No.: US 8,887,040 B2
(45) Date of Patent: Nov. 11, 2014

(54) SYSTEM AND METHOD FOR MEDIA CONTENT DELIVERY

(75) Inventors: Rajarshi Ray, San Diego, CA (US); Ted Matsumoto, Yokohama (JP)

(73) Assignee: Qualcomm Incorporated, San Diego, CA (US)

( * ) Notice: Subject to any disclaimer, the term of this patent is extended or adjusted under 35 U.S.C. 154(b) by 1458 days.

(21) Appl. No.: 11/678,909

(22) Filed: Feb. 26, 2007

(65) Prior Publication Data

US 2008/0040354 A1    Feb. 14, 2008

Related U.S. Application Data

(60) Provisional application No. 60/837,266, filed on Aug. 10, 2006, provisional application No. 60/846,708, filed on Sep. 21, 2006, provisional application No. 60/886,652, filed on Jan. 25, 2007.

(51) Int. Cl.
| | |
|---|---|
| *G06F 7/00* | (2006.01) |
| *G06F 17/30* | (2006.01) |
| *H04L 29/06* | (2006.01) |
| *H04M 1/725* | (2006.01) |
| *H04L 29/08* | (2006.01) |
| *H04L 12/18* | (2006.01) |

(52) U.S. Cl.
CPC ..... *G06F 17/30035* (2013.01); *H04M 1/72525* (2013.01); *H04L 67/306* (2013.01); *H04L 65/604* (2013.01); *H04L 29/06027* (2013.01); *G06F 17/30038* (2013.01); *H04L 12/189* (2013.01); *H04L 67/26* (2013.01); *H04L 65/4076* (2013.01)
USPC ............ 715/253; 715/235; 715/239; 715/255

(58) Field of Classification Search
CPC ..................... G06F 17/30035; G06F 17/30038
USPC .................................. 715/235, 239, 253, 255
See application file for complete search history.

(56) References Cited

U.S. PATENT DOCUMENTS

| | | | | |
|---|---|---|---|---|
| 4,755,045 | A | * | 7/1988 | Borah et al. .................. 351/210 |
| 4,870,611 | A | * | 9/1989 | Martin et al. ................. 715/209 |

(Continued)

FOREIGN PATENT DOCUMENTS

| | | |
|---|---|---|
| TW | 200420068 | 10/2004 |
| WO | 9708906 | 3/1997 |

(Continued)

OTHER PUBLICATIONS

Written Opinion—PCT/US07/075509, International Search Authority—European Patent Office—Feb. 28, 2008.

(Continued)

*Primary Examiner* — Stephen Hong
*Assistant Examiner* — Marshon Robinson
(74) *Attorney, Agent, or Firm* — Abdollah Katbab

(57) ABSTRACT

Systems and methodologies are described that facilitate the automated delivery of media content, such as music, audio clips, advertisements and including other digitized multimedia files, in a wireless communication environment. In an aspect, the media content may be downloaded to a user based on various user-characteristics, such as a profile of the user, the preferences of the user for a genre of media content, and the behavior of the user with respect to user actions on a wireless communication device.

21 Claims, 13 Drawing Sheets

(56) References Cited

U.S. PATENT DOCUMENTS

| | | | |
|---|---|---|---|
| 5,748,956 A * | 5/1998 | Lafer et al. | 715/863 |
| 5,890,152 A * | 3/1999 | Rapaport et al. | 1/1 |
| 6,018,342 A * | 1/2000 | Bristor | 715/840 |
| 6,091,956 A | 7/2000 | Hollenberg | |
| 6,108,637 A * | 8/2000 | Blumenau | 715/204 |
| 6,161,140 A * | 12/2000 | Moriya | 709/228 |
| 6,421,706 B1 * | 7/2002 | McNeill et al. | 709/204 |
| 6,886,129 B1 * | 4/2005 | Raghavan et al. | 715/205 |
| 7,167,841 B2 * | 1/2007 | Hatano et al. | 705/56 |
| 7,406,329 B2 | 7/2008 | Khurana et al. | |
| 2001/0034745 A1 * | 10/2001 | Ishii et al. | 707/514 |
| 2001/0045962 A1 * | 11/2001 | Lee et al. | 345/745 |
| 2002/0087594 A1 * | 7/2002 | Peters | 707/511 |
| 2002/0103935 A1 | 8/2002 | Fishman et al. | |
| 2002/0129067 A1 * | 9/2002 | Dames et al. | 707/523 |
| 2002/0138527 A1 * | 9/2002 | Bell et al. | 707/530 |
| 2002/0152242 A1 * | 10/2002 | Meyer et al. | 707/526 |
| 2002/0161712 A1 * | 10/2002 | Hatano et al. | 705/52 |
| 2003/0097635 A1 * | 5/2003 | Giannetti | 715/501.1 |
| 2003/0140313 A1 * | 7/2003 | Smith | 715/514 |
| 2003/0156135 A1 * | 8/2003 | Lucarelli | 345/757 |
| 2004/0107242 A1 | 6/2004 | Vert et al. | |
| 2005/0149880 A1 * | 7/2005 | Postrel | 715/808 |
| 2006/0004866 A1 * | 1/2006 | Lawrence et al. | 707/104.1 |
| 2006/0027648 A1 * | 2/2006 | Cheah | 235/381 |
| 2006/0052089 A1 * | 3/2006 | Khurana et al. | 455/414.1 |
| 2006/0155604 A1 * | 7/2006 | Bard | 705/14 |
| 2006/0167749 A1 * | 7/2006 | Pitkow et al. | 705/14 |
| 2006/0212803 A1 * | 9/2006 | Arokiaswamy | 715/520 |
| 2006/0288395 A1 * | 12/2006 | DiLorenzo | 725/113 |
| 2007/0033531 A1 * | 2/2007 | Marsh | 715/738 |
| 2007/0043766 A1 * | 2/2007 | Nicholas et al. | 707/104.1 |
| 2008/0066003 A1 * | 3/2008 | Vong | 715/763 |
| 2008/0072150 A1 * | 3/2008 | Chan et al. | 715/708 |
| 2008/0126476 A1 * | 5/2008 | Nicholas et al. | 709/203 |
| 2009/0055730 A1 * | 2/2009 | Cheah | 715/255 |
| 2011/0288916 A1 * | 11/2011 | Pitkow et al. | 705/14.4 |

FOREIGN PATENT DOCUMENTS

| | | |
|---|---|---|
| WO | 9741654 | 11/1997 |
| WO | 9815091 | 4/1998 |
| WO | 0158100 | 8/2001 |

OTHER PUBLICATIONS

International Preliminary Report on Patentability—PCT/US07/075509—European Patent Office—Nov. 27, 2008.

Chavez E. et al: "Interactive applications of personal situation-aware assistants" Computer and Graphics, Elsevier, GB, vol. 23, No. 6, Dec. 1999, pp. 903-915, XP004187839.

Chavez E. et al: "SAMoA: An experimental platform for Situation-Aware Mobile Assistance" (Online) 1998, XP002167637.

International Search Report—PCT/US07/075509, International Search Authority—European Patent Office—Feb. 28, 2008.

Taiwan Search Report—TW096129756—TIPO—Mar. 25, 2011.

* cited by examiner

SYSTEM AND METHOD FOR MEDIA CONTENT DELIVERY

CLAIM OF PRIORITY UNDER 35 U.S.C. §119

The present Application for Patent claims priority to Provisional Application No. 60/837,266 entitled "Method and Device for Direct Music Delivery" filed Aug. 10, 2006, to Provisional Application No. 60/846,708 entitled "System and Method for Media Content Delivery" filed Sep. 21, 2006, and to Provisional Application No. 60/886,652 entitled "System and Method for Media Content Delivery" filed Jan. 25, 2007, each assigned to the assignee hereof and each hereby expressly incorporated by reference herein.

BACKGROUND

I. Field

The described aspects relate generally to wireless communications, and more particularly to delivering media content to wireless devices.

II. Background

Wireless communication systems have become a prevalent means by which a majority of people worldwide communicate. Wireless communication devices have become smaller and more powerful in order to meet consumer needs and to improve portability and convenience. Further, the increase in processing power in wireless communication devices, such as cellular telephones, has lead to an increase in demands on wireless network transmission systems. As wireless communication device capabilities expand and also the demand from users for improved data-services increases, it can be difficult to maintain an older wireless network system in a manner that facilitates fully exploiting new and improved wireless communication device capabilities, such as the delivery of media content such as music into the wireless communication device. In particular, many old communication networks may not be able to handle the data throughput required by users downloading large amounts of media content, such as music files, onto their wireless communication devices. Correspondingly, many wireless communication devices operating on these older networks may not have the processing power, capability and/or memory to respectively process and/or store the media content, such as music files.

For example, service providers have found that it is not economically and/or technologically feasible to establish a compelling and user-friendly music delivery service for providing "near compact disc (CD) quality" music files, in the prevailing format of MPEG Audio Layer 3 (MP3) through over-the-air transmission to wireless devices operating on a GSM and/or a CDMA2000 1X wireless network, because of the very high data-download time associated with these files over such networks. Further, scaling a music delivery service based on this data-format, for use by any economically feasible number of users of these networks, may exceed the network capacity, thereby overloading the data transfer capabilities of the network. As such, any current attempt to implement such a service in such a network would likely result in numerous network problems, including network congestion and crashes.

Additionally, the distribution of the downloaded music, including tracking and controlling consumers wishing to download music into their wireless communication devices, is an issue due to concerns relating to piracy of the downloaded music. More generally, tracking and controlling the distribution of downloaded media content is an issue.

Additionally, the proposition of adding a content delivery service to a communication network servicing wireless devices can be an expensive proposition for the owner of the network, such as the carrier. This is especially true when you consider that the owner or carrier may not have sufficient funds to purchase new and improved wireless communication network technologies. Also, slow adoption of such a new service by network subscribers lengthens the return on investment for the network owner or carrier, thereby increasing the financial strain of maintaining operations.

Further, in some media content delivery systems, more than one piece and/or type of content may be delivered to a device. As such, a device attempting to output multiple pieces and/or types of content to a user may experience problems with interference between each piece and/or type of content during a simultaneous presentation.

Thus, there exists a need for a system and/or methodology of delivering state-of-the-art media content over older, slower wireless networks having less than state-of-the-art data throughput capabilities, for addressing piracy issues involving consumers with respect to delivered media content, and for reducing the financial burden of implementing a media content delivery service. Additionally, there exists a need for apparatus and methods to simplify the simultaneous presentation of multiple pieces and/or types of content.

SUMMARY

The following presents a simplified summary of one or more aspects in order to provide a basic understanding. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects presented herein relate to delivering media content, such as music, to a wireless communication device whether the device utilizes multicast (broadcast) networks, unicast networks, or some combination of both multicast and unicast networks. An example of such combination network is a forward-link-only (FLO) system which has two types of networks available: (1) FLO as a multicast (broadcast) network and (2) CDMA 1x EV-DO as a unicast network.

The aspects presented herein may be applied to any type of frequent, infrequent and/or critical information delivery to devices in wireless networks. In an aspect, media content may be downloaded to a user based on a profile of the user, the preferences of the user for a genre of media content, and the behavior of the user with respect to the user's actions on a wireless communication device.

In an aspect, a method of receiving and managing content on a device comprises receiving a plurality of content and combining one of the plurality of content with a user-selected content. The user-selected content comprises a predetermined marker operable to define a presentation attribute of content to be combined with the user-selected content. Also, the method includes reformatting the one of the plurality of content from a first content format to a second content format based on the predetermined marker, wherein reformatting is operable to allow execution of the one of the plurality of content with the user-selected content. Additionally, the method includes generating a content presentation including a combination of the user-selected content, in the second content format, and the one of the plurality of content.

In a related aspect, at least one processor is configured to perform the actions of the above-described method. In another related aspect, a computer program product comprises a computer readable medium including a set of codes operable to cause a computer to perform the actions of the above-described method.

In another aspect, a computer device comprises means for receiving a plurality of content and means for combining one of the plurality of content with a user-selected content. The user-selected content comprises a predetermined marker operable to define a presentation attribute of content to be combined with the user-selected content. Also, the computer device includes means for reformatting the one of the plurality of content from a first content format to a second content format based on the predetermined marker, wherein reformatting is operable to allow execution of the one of the plurality of content with the user-selected content. Additionally, the computer device includes means for generating a content presentation including a combination of the user-selected content, in the second content format, and the one of the plurality of content.

In a further aspect, a computer device comprises a device interface operable to receive a first user input, and a receiver operable to receive a plurality of media content from a communications network. The computer device also comprises a memory comprising a media management module and a mixer/aggregator module. The memory is operable to store the plurality of media content. The computer device further comprises a processor in communication with the device interface, the receiver and the memory. The processor is operable to execute the mixer/aggregator module to combine one of the plurality of media content with a user-selected content, wherein the user-selected content is based on the first user input associated with execution of the media management module by the processor. Also, the user-selected content comprises a predetermined marker operable to define a presentation attribute of content to be combined with the user-selected content. The computer device further comprises a reformat module operable to be initiated by the mixer/aggregator module and operable to be executed by the processor to reformat the one of the plurality of media content from a first content format to a second content format based on the predetermined marker. The second content format is operable to allow execution of the one of the plurality of media content with the user-selected content. Additionally, the mixer/aggregator module is further operable to initiate generation of a content presentation including a combination of the user-selected content, in the second content format, and the one of the plurality of media content.

In other aspects, a method of distributing content comprises obtaining a plurality of content each having content metadata, and receiving a plurality of user profile information each associated with one of a plurality of devices operable to execute the plurality of content. The method also comprises determining a delivery schedule for selected ones of the plurality of content to be delivered to selected ones of the plurality of devices based on a predetermined combination of each of at least two of the plurality of user profile information, the content metadata associated with each of the plurality of content, and network capacity information of a communications network associated with each of the plurality of devices. Additionally, the method comprises transmitting, via the respective communications network, the selected ones of the plurality of content to the selected ones of a plurality of devices based on the delivery schedule.

In a related aspect, at least one processor is configured to perform the actions of the above-described method. In another related aspect, a computer program product comprises a computer readable medium including a set of codes operable to cause a computer to perform the actions of the above-described method.

In an aspect, a network device comprises means for obtaining a plurality of content each having content metadata, and means for receiving a plurality of user profile information each associated with one of a plurality of devices operable to execute the plurality of content. Further, the network device comprises means for determining a delivery schedule for selected ones of the plurality of content to be delivered to selected ones of the plurality of devices based on a predetermined combination of each of at least two of the plurality of user profile information, the content metadata associated with each of the plurality of content, and network capacity information of a communications network associated with each of the plurality of devices. Additionally, the network device comprises means for transmitting via the respective communications network the selected ones of the plurality of content to the selected ones of a plurality of devices based on the delivery schedule.

Another aspect includes a network device that comprises a receiver operable to obtain a plurality of content, each having content metadata, and a plurality of user profile information, each associated with one of a plurality of devices operable to execute the plurality of content. The network device further comprises a memory comprising a management module operable to determine a delivery schedule for selected ones of the plurality of content to be delivered to selected ones of the plurality of devices based on a predetermined combination of each of at least two of the plurality of user profile information, the content metadata associated with each of the plurality of content, and network capacity information of a communications network associated with each of the plurality of devices. Also, the network device comprises a processor in communication with the memory and operable to execute the management module to generate the delivery schedule. Additionally, the network device comprises a transmitter operable to transmit via the respective communications network the selected ones of the plurality of content to the selected ones of a plurality of devices based on the delivery schedule.

In another aspect, a method of managing media content comprises obtaining a media management module, and connecting to a wireless communications network having a peak data rate of less than about 160 kilobits per second (kbps). Further, the method includes receiving a media content file having a predetermined compressed format of less than about 64 kbps, and storing the media content file for execution by the media management module.

In a related aspect, at least one processor is configured to perform the actions of the above-described method. In another related aspect, a computer program product comprises a computer readable medium including a set of codes operable to cause a computer to perform the actions of the above-described method.

In another aspect, an apparatus for managing media content comprises means for obtaining a media management module, and means for connecting to a wireless communications network having a peak data rate of less than about 160 kilobits per second (kbps). Further, the apparatus comprises means for receiving a media content file having a predetermined compressed format of less than about 64 kbps, and means for storing the media content file for execution by the media management module.

In an aspect, a wireless device comprises a processor comprising integrated logic to operate a baseband modem, a radio transceiver and a power management functionality in a single chip. The wireless device also comprises a communications module operable to exchange communications with a wireless communications network. Additionally, the wireless device comprises a system memory having a media management module and a media content file, wherein the media content file comprises a predetermined compressed format of less than about 64 kilobits per second (kbps) received at a peak data rate of less than about 160 kbps by the communications module from the wireless communications network, and wherein the media management module is operable to play the media content file.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
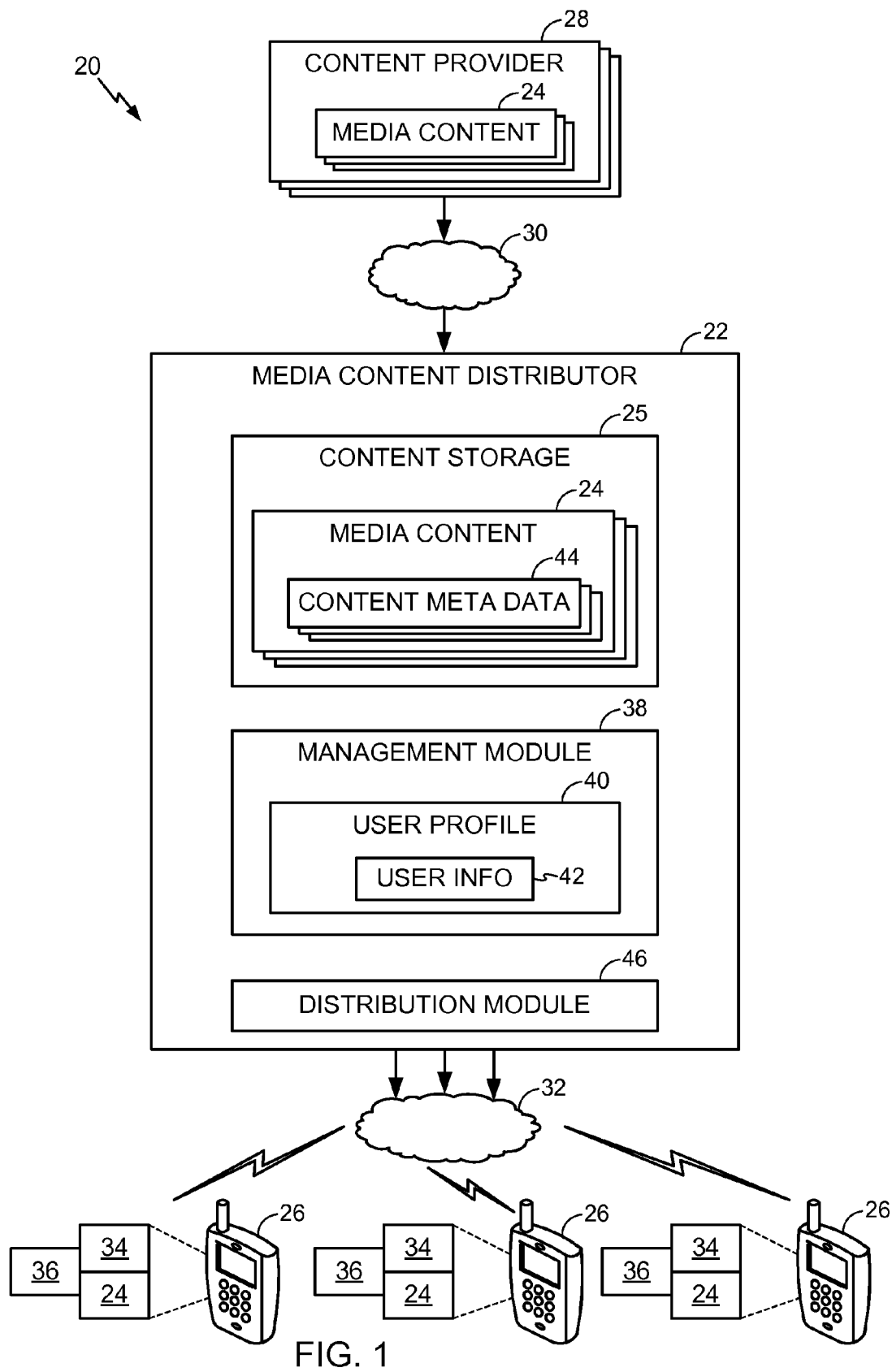
FIG. 1 is a schematic representation of one aspect of a system comprising apparatus and methods for the delivery and consumption of media content.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident; however, that such aspect(s) may be practiced without these specific details. In other instances, well-known structures and devices are shown in block diagram form in order to facilitate describing one or more aspects.

As used in this application, the terms "component," "system," "module," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices and/or other machine-readable media for storing information. The terms "computer-readable medium" and "machine-readable medium" can include, without being limited to, wireless channels and various other media capable of storing, containing, and/or carrying instruction(s) and/or data.

Referring to FIG. 1, a media content delivery system 20 comprises a media content distributor 22 operable to provide one or more pieces of media content 24 to one or more wireless communication devices 26. Media content distributor 22 may be operable to obtain each piece of media content 24 from one or more content providers 28, for example, via a first communication link 30. In some aspects, received media content 24 may be held in a content storage 25 associated with media content distributor 22. Further, media content distributor 22 may transmit a selected one piece or a selected plurality of pieces of media content 24 to one or more wireless communication device 26, for example, via a second communication link 32.

Each wireless communication device 26 may comprise a processor 34 operable to execute a media management module 36, which is operable to cause processor 34 to generate the respective piece of media content 24 on the given wireless communication device 26. Media management module 36 may be further operable to manage information corresponding to the request for, manipulation of, and retention of media content 24 on the respective wireless communication device 26.

Thus, system 20 provides apparatus and methods for media content delivery and consumption.

Further, in some optional aspects, media content distributor 22 may further include a management module 38 comprising a user profile 40 corresponding to the user of each wireless communication device 26. User profile 40 comprises user information 42, such as user preferences and/or behavioral information. Similarly, each piece of media content 24 comprises content metadata 44, which provides attributes and/or characteristics of the respective piece of content 24. Further, management module 38 may be operable to match at least a portion of user information 42 with at least a portion of content metadata 44, thereby enabling system 20 to selectively distribute, such as via a distribution module 46, different media content 24, such as advertisements and/or short clips of available full length content, to a selected one or more wireless communication devices 26.

Thus, in some optional aspects, system 20 provides for targeting the delivery of selected media content to selected wireless communication device based on a user profile 40 corresponding to a user of the respective device.

Additionally, in some aspects, media content delivery system 20 may be particularly configured as a relatively low end media content delivery system. As discussed herein, the terms "relatively low end media content delivery system" refer to a content delivery system having a first cost and/or a first level of technology less than a second cost and/or a second level of technology associated with a state-of-the-art media content delivery system. In other words, a relatively high end and/or state-of-the-art media content delivery system typically utilizes equipment operating with the latest hardware and/or software technology, thereby generally having substantially greater data transfer speed and substantially greater data capacity than a relatively low end media content delivery system. For example, such a low end media content delivery system may be desirable in regions where state-of-the-art wireless network equipment, and/or state of the art wireless communication devices, are not available and/or are not economically feasible for implementing in combination with a media content delivery system. For example, such a relatively low end media content delivery system may be desirable in underprivileged countries and/or "emerging markets" where both network providers and wireless device users may not have the economic ability to obtain state-of-the-art equipment. Further, for example, a low end media content delivery system may be able to provide media content delivery services in regions where providing such services, according to prevailing standards, is not technologically feasible, as such a media content delivery service would overwhelm the capacity of existing low cost or low technology networks.

One or some combination of system attributes may contribute to the aspect of a low cost configuration of system 20. For example, when compared to a state-of-the-art media content delivery system operating based on prevailing minimally-acceptable standards, aspects of system 20 may include one or any combination of attributes to enable an economically and technologically feasible media content service on a slower, lower capacity network, such as second communication link 32. In particular, a low cost configuration of system 20 may combine one or more of the following features: utilizing mechanisms to provide for a more compact media content file with a quality level comparable to the quality of prevailing formats; providing low cost wireless communication devices, such as by integrating processing functionalities onto an inexpensive, yet powerful, chip design; providing mechanisms for reducing the purchase cost of media content to the end user, such as by allowing user-specific advertising in exchange for lower media costs; providing mechanisms to offset the cost of implementing the service, such as by providing fees to the carrier or network operator implementing the system, including one or more of a fee from content providers for exposure to users, e.g. devices, operating on the network and using the service, a fee from user transactions based on delivered content, a fee from transactions for other goods and/or services purchased by users based on exposure to the provided content, and a fee for marketing information based on user information and user behavior with respect to downloading and interacting with the provided content; and, by providing simplified mechanisms for controlling digital rights management.

The main components of system 20 will now be discussed.

Content provider 28 comprises any source of media content 24, and may include one or any combination of apparatus, such as servers, databases, workstations, etc., including hardware and/or software operable to provide media content 24 to media content distributor 22. For example, content provider 28 may comprise a music service, a movie service, an advertising service, a video service, etc., as well as individual artists, content distributors, and any other source of media content 24. In some aspects, for example, content provider 28 may further include the network carrier associated with the communication network on which a device operates. Further, system 20 may include any number of content providers 28.

Media content 24 may comprise at least one, or any combination, of video, audio, text, graphics, images, multimedia, clips, real-time and non-real-time content, ring tones, scripts, programs or applications, electronic coupons, data or any other type of distributable content. In some aspects, for example, media content 24 may comprise audio content, which may be mixed with non-audio content such as images, video, text, etc. Further, for example, the audio content may include music files, and additional content may include advertisements.

Additionally, one or more content metadata 44 is associated with each piece of media content 24. For example, content metadata 44 may include one or any combination of: an unique identifier or name of the respective content; an identifier indicating the content type of the respective content, such as audio, video, text, graphic/image, multimedia, primary content and secondary content (discussed below) etc.; content format or protocol; content length; content size; content execution requirements; a content provider identifier; a content author identifier; and any other data provides information about a respective piece of content.

Figure 2:
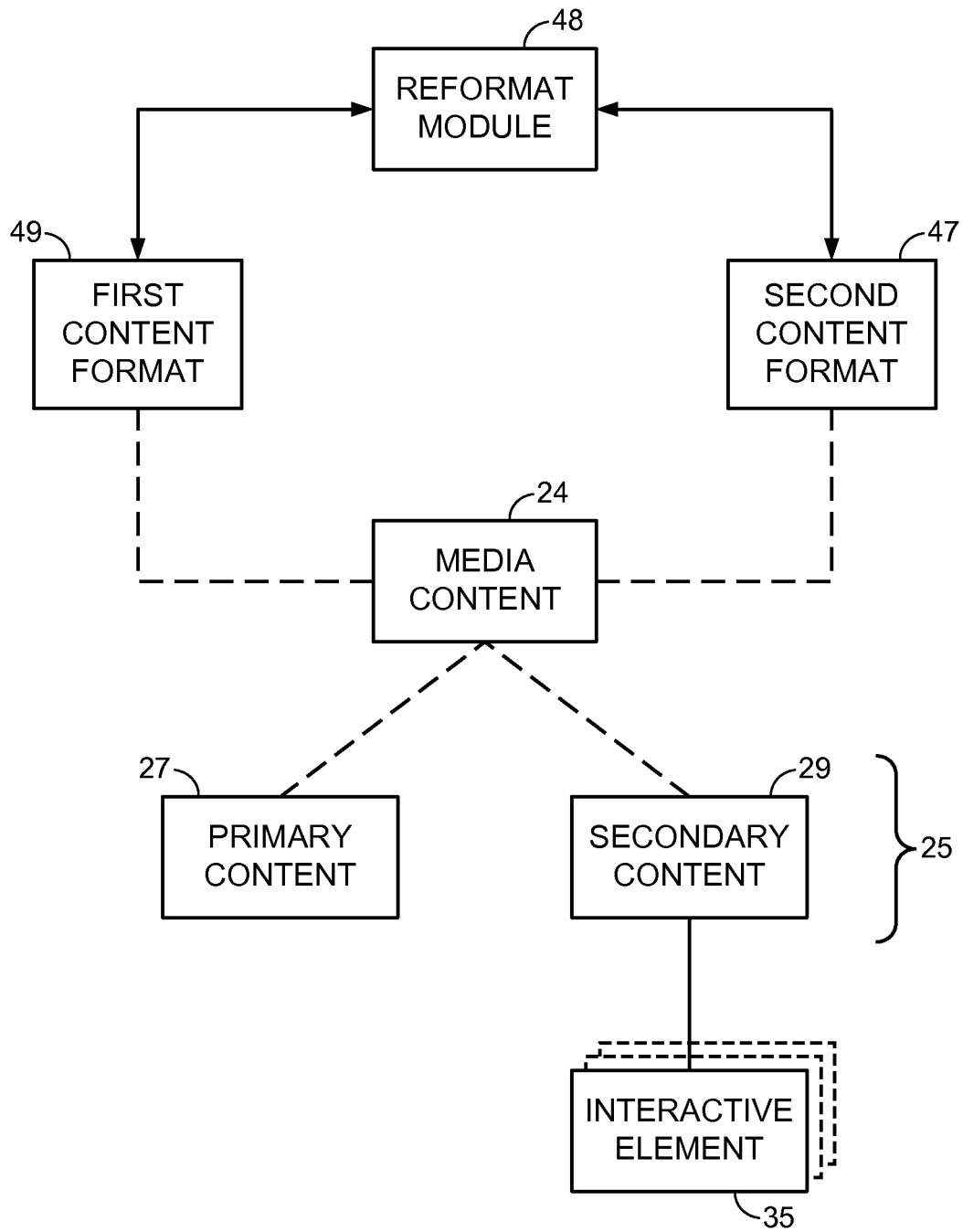
FIG. 2 is a schematic drawings of the media content, and some attributes, as well as a reformat module operable with the system of FIG. 1.
Figure 3:
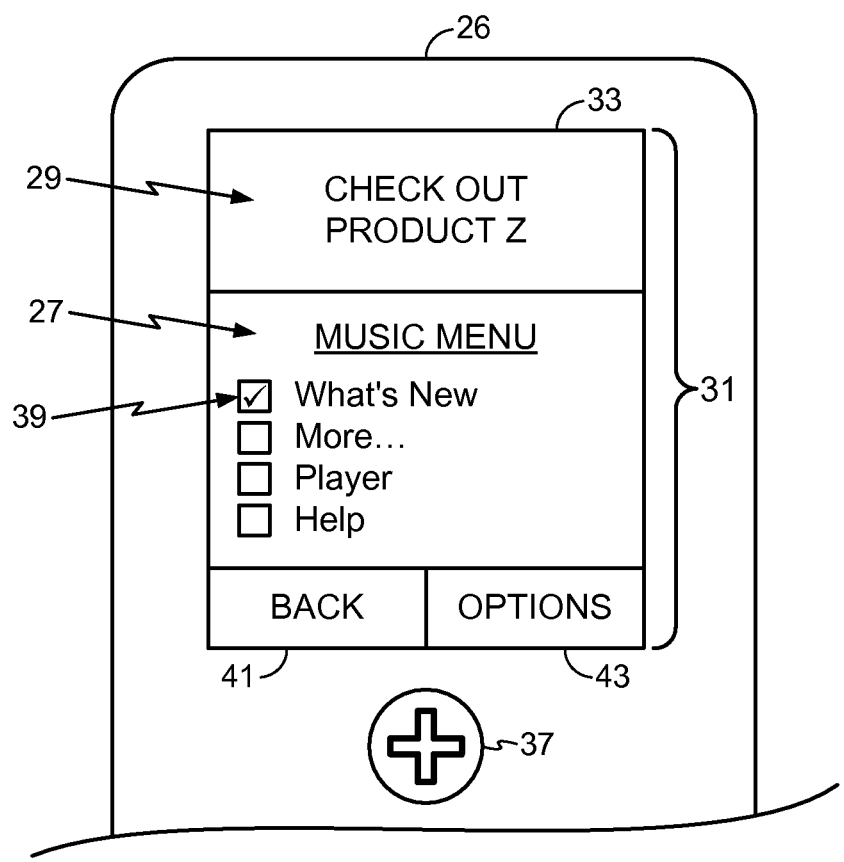
FIG. 3 is a partial plan view of the display portion of a wireless device executing according to the system of FIG. 1.

Referring to FIGS. 2 and 3, in some aspects, each piece of media content 24 may be associated with a content type 25 including a primary content 27 and a secondary content 29. In some aspects, primary content 27 indicates that media content 24 is intended to be the base content presented as an output by a device, such as a view 31 (FIG. 3) on a display 33 (FIG. 3) of wireless device 26 (FIG. 3). On the other hand, secondary content 29 indicates that media content 24 is intended to supplement primary content 27, such as to be presented either simultaneously with, and/or in place of, and/or appended to primary content 29 and/or some other output, such as a view, menu or page associated with an application or module being presented on the respective device. For example, in one aspect, primary content 27 may comprise a video or a song, while secondary content 29 may comprise an advertisement or "ad", such as a text ad or banner ad, presented in combination with the video or song. In another example, secondary content 27 may be presented during a break in primary content 29, such as during a wait period while the device is in the process of downloading and/or initiating the execution of primary content 27. In another example, secondary content 29 may comprise a coupon, which may be stored in device memory of a wireless or wired device. As such, secondary content 29 is stored on wireless device 26 and available for execution at any time. In any case, the relative presentation of primary content 27 and secondary content 29 is fully controllable within system 20 (see FIG. 1), for example by content provider 28 and/or media content distributor 22, such as through content metadata 44 and/or the programming of media management module 36 on wireless device 26.

Further, secondary content 29 may further comprise one or more interactive elements 35, which may relate to a measure of an interest in the respective media content 24 by the respective user. For example, interactive elements 35 may include one or more of: a base element, such as the initial presentation of an ad along with a measure of the length of the ad consumed by the user; and additional elements, such as additional content details, a purchasing mechanism, a delete mechanism, a save mechanism, and any other user interactive elements that may be associated with media content 24.

For example, referring to FIG. 3, a user may experience secondary content 29 comprising an ad for a product while running a music application as primary content 29. Then, the user of device 26 may then input a request, such as by actuating one or more navigation keys 37 to maneuver a selection indicator 39, such as marker or a highlight, between selectable areas, such as between options under the music menu, the secondary content 29, and virtual keys 41 and 43. For example, virtual key 41 may comprise a "Back" key to return the user to the prior output state, e.g. the prior menu. Further, virtual key 43 may comprise an "Options" key, which may subsequently present the user with different options depending on the selected active area. For example, if the user highlights secondary content 29 and enters "Options" key 41, then the user may be presented with one or more of an option for additional content details, for purchasing, for saving the ad, for deleting the ad, etc.

Figure 4:
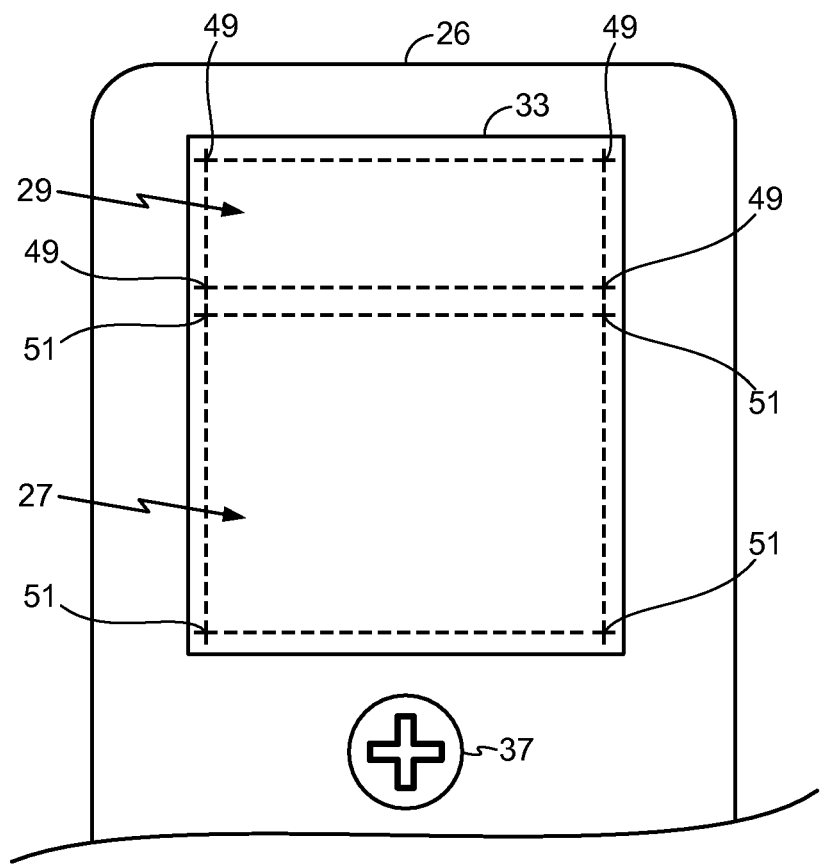
FIG. 4 is a partial plan view of the display portion of the wireless device of FIG. 3, including markers for different content.

Additionally, referring to FIGS. 2 and 4, in some aspects, each piece of media content 24 may be associated with a first content format 45 and a second content format 47. For example, each of first content format 45 and second content format 47 may comprise a content size, shape, protocol, color quality, sound quality, and any other characteristic that may affect the generation of the respective media content 24 on wireless device 26.

In some aspects, media content distributor 22 (FIG. 1) and/or wireless device 26 (FIG. 1) may comprise a reformat module 48 (FIG. 2) comprising hardware and/or software operable to change media content 24 between first content format 45 and second content format 47. For example, media content distributor 22 (FIG. 1) and/or wireless device 26 (FIG. 1) may receive media content 24 in first content format 45, but may need to change the respective media content to second content format 47 to enable or optimize distribution and/or execution/presentation of the respective media content.

For example, media content distributor 22 (FIG. 1) may not be able to efficiently distribute media content 24 in first format 45, for example if the memory size is too large relative to the available capacity of second communication link 32. In this case, reformat module 48 at media content distributor 22 may compress media content 24 into second format 47 having a reduced memory size.

In another example, additionally referring to FIG. 4, an available space, as defined by one or more secondary content markers 49 and/or one or more primary content markers 51 with respect to display 33, for secondary content 29 may be different from the shape or size of secondary content 29 based on first format 45. For example, secondary content markers 49 and primary content markers 51 may literally outline the available space for the respective content type, or may provide information allowing the derivation of the available space. Further, it should be noted that one or more secondary content markers 49 and/or one or more primary content markers 51 may define available space for more than one secondary content 29, and/or more than one primary content 27. In any case, in this example, reformat module 48 on wireless device 26 may resize secondary content 29 into second format 47 that allows for presentation of secondary content 29 in the available space.

Other examples include reformat module 48 changing characteristics, such as sound quality, color, etc., of media content 24 to match the hardware and/or software capabilities available on a given wireless device 26.

Referring back to FIG. 1, media content distributor 22 comprises a memory operable to store content and applications or modules, and a processor operable to execute the modules to perform the functionality described herein. For example, media content distributor 22 may be implemented in one or any combination of apparatus, such as servers, databases, workstations, etc., including hardware and/or software operable to provide media content 24 for distribution to users, such as wireless devices 26, in system 20. Further, for example, in some aspects, media content distributor 22 comprises a network carrier operating a content distribution service, including distributing a content playing application or software agent and/or distributing content executable by a content playing application or software agent. As noted above, media content distributor 22 includes management module 38 that operates to control the provisioning and distribution of content 24 to a user, such as through distribution module 46. For example, distribution module 46 transmits one or more pieces of selected content 24 to one or more selected users, such as a respective wireless device 26, via second communication link 32, which comprises any suitable type of wireless communication link. Distribution module 46 may include any type of content transport mechanism, as is discussed below.

Figure 5:
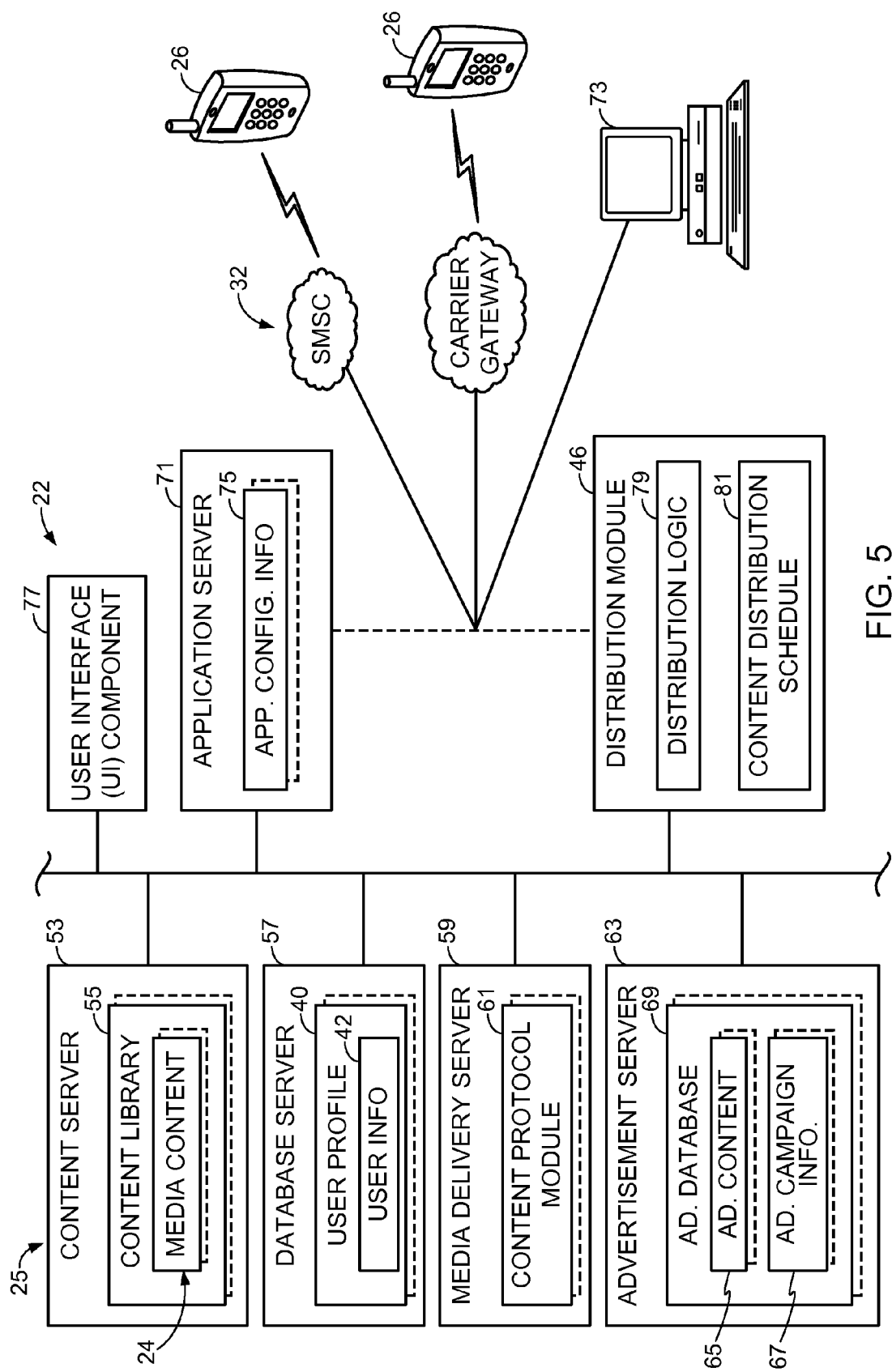
FIG. 5 is a schematic diagram of an aspect of the media content distributor, communication links and devices of FIG. 1.

Referring to FIG. 5, media content distributor 22 may comprise a number of functionalities, which may be carried out by one or any combination of components.

For example, in some aspects, content storage 25 (also see FIG. 1) associated with media content distributor 22 may include one or more content servers 55 having one or more content libraries 57. Each content library 57 may be operable to store a plurality of media content 24. For example, in some cases, there may be separate content servers 53 and/or separate content libraries 55 for each type of media content, such as primary content, secondary content, music, videos, etc. In some aspects, content library 57 includes a picture library, a ring tones library, and a songs library.

Further, media content distributor 22 may include one or more database servers 57, for example, which are operable to store a database of user profiles 40 and/or user information 42. Further, in some aspects, one or more database servers 57 may comprise a production server having a user database storing the aforementioned user information, a media database for storing content-related information, and a publisher database for storing content provider-related and/or advertiser-related information.

User profile 40 and/or user information 42 may comprise a myriad of information about the user. For example, user profile 40 and/or user information 42 may comprise one or any combination of user/subscriber data such as name, address, phone number, Internet Protocol address, billing information, subscription information, demographic information, geographic location information, content transaction history information, such as content purchased, genre selected, ads viewed, etc.

In some aspects, billing information may include subscription information as well as geographic location information.

In some aspects, user profile 40 and/or user information 42 may include both static information and dynamic information. Dynamic information may include position location information and the behavior of the user as it relates to the wireless communication device. Dynamic information may include when and which applications that the user has downloaded, which may be indicative of the type of music in which the user may have an interest. Dynamic information may also include when and which music the user has downloaded, how many times the user has listened to a particular piece of music, and how much of the music the user has listened to. Thus, there are a myriad of behavioral attributes of the user that may be included in the user profile.

Further, in some aspects, user profile 40 and/or user information 42 may include user environment information, such as display screen formatting and/or capability information, audio output capabilities, processor capability, media port in use, and any other hardware and/or software characteristic that may affect the execution and/or generation of media content 24 on the respective device. As such, media content 24 transmitted to the user may be displayed in a format that is suitable for the user's environment, including the form-factors of the respective wireless device of the user. For example, this includes presenting the media content file to the user such that the media content file is adaptively changed to display it in the wireless device screen based on its screen formats, or such that the media content file plays on the wireless device speaker or headset-jacks based on user's current hardware and/or software.

Further, media content distributor 22 may include one or more media delivery servers 59 operable to deliver media content to a user/subscriber device, such as a handset or such as wireless device 26, from one or more of the content libraries 55. Further, in some aspects, one or more media delivery servers 59 may comprise one or more content protocol modules 61 for transferring content 24. For example, content protocol modules 61 may include one or any combination of a Real Time Streaming Protocol (RTSP) module, a Multimedia Messaging Service (MMS) module, a Simple Mail Transfer Protocol (SMTP) module, a downloading module, a previewing module, and a streaming module.

Additionally, media content distributor 22 may include one or more advertisement servers 63 operable to manage portions of the advertising aspects described herein. For example, one or more advertisement servers 63 may have advertising content 65 and advertising campaign information 67 associated with a predetermined application and/or predetermined content, which may be stored in an advertisement database 69 operable to correlate advertisements, campaigns and agencies associated therewith.

Further, media content distributor 22 may include one or more user interface components 77 that allow for the uploading and management of data, such as content and user information. For example, such user interface components may include one or any combination of a content automation tool (CAT), a media partner tool, a batch upload module, and a single upload or modify module. In some aspects, for example, the batch upload module associated with database server 57 may upload xls and content to the CAT and media partner tool, which then interface with other servers such as database server 57.

Additionally, in some aspects, media content distributor 22 may include one or more application servers 71. For example, in some aspects, application servers 71 may act as middleware between the other servers, such as content server 53 and database server 57, and one or more networks 32 and/or wireless devices 26 and/or other computer devices, such as terminal 73. Further, in some aspects, application server 71 may include application configuration information 75. In some aspects, application server 71 may comprise distribution module 46, which includes or is linked to one or more transport interfaces, such as network 32, to devices and/or computers designated to receive media content. For example, distribution module 46 may include or may interface with network services 32 including one or any combination of a Short Message Service Center (SMSC) operable to interface with an SMSC link, a mobile service operable to provide an interface to a carrier gateway, a web service operable to provide an interface to terminal 73, and a reporting service operable to gather and report system information to parties of interest, such as a system administrator, carrier, publisher, content provider, advertiser, marketer, etc. It should also be noted, however, that in other aspects distribution module 46 may be associated with media delivery server 59

In another aspect distribution module 46 may include distribution logic 79 operable to determine a content distribution schedule 81 for one or more content-receiving devices, such as wireless devices 26 and/or terminal 73. In particular, in some aspects where primary-type content 25 (FIG. 2) is sent to devices based on a received request, distribution schedule 81 typically relates to the pushing of secondary content 27 (FIG. 2) to the devices by media content distributor 22. It should be noted, however, that content 24 may be pushed to the user or pulled from a server, such as based on a request from media management module 36 (FIG. 1) that a device is ready to receive content. For example, distribution logic 79 may include algorithms, fuzzy logic, heuristics, etc., for determining how many pieces of secondary content 27 to send to what devices, based on one or any combination of parameters such as available network capacity, the numbers of devices to receive content, the size of the content to be delivered, user preferences, system administrator preferences, content metadata, and any other constraints associated with batch delivery of content on a network. For example, content metadata 44 (FIG. 1) may identify content placement, for example if an advertiser pays to guarantee when and/or where their content is presented, etc. Further, for example, in some aspects, distribution logic 79 may be further operable to determine the characteristics associated with each piece of media content 24 designated for each device, such as based on a match between content metadata 44 (FIG. 1) and user information 42. Thus, distribution schedule 81 may comprise one or more sets of media content 24 to be delivered to one or more devices at a predetermined time and through a predetermined transport mechanism.

Figure 6:
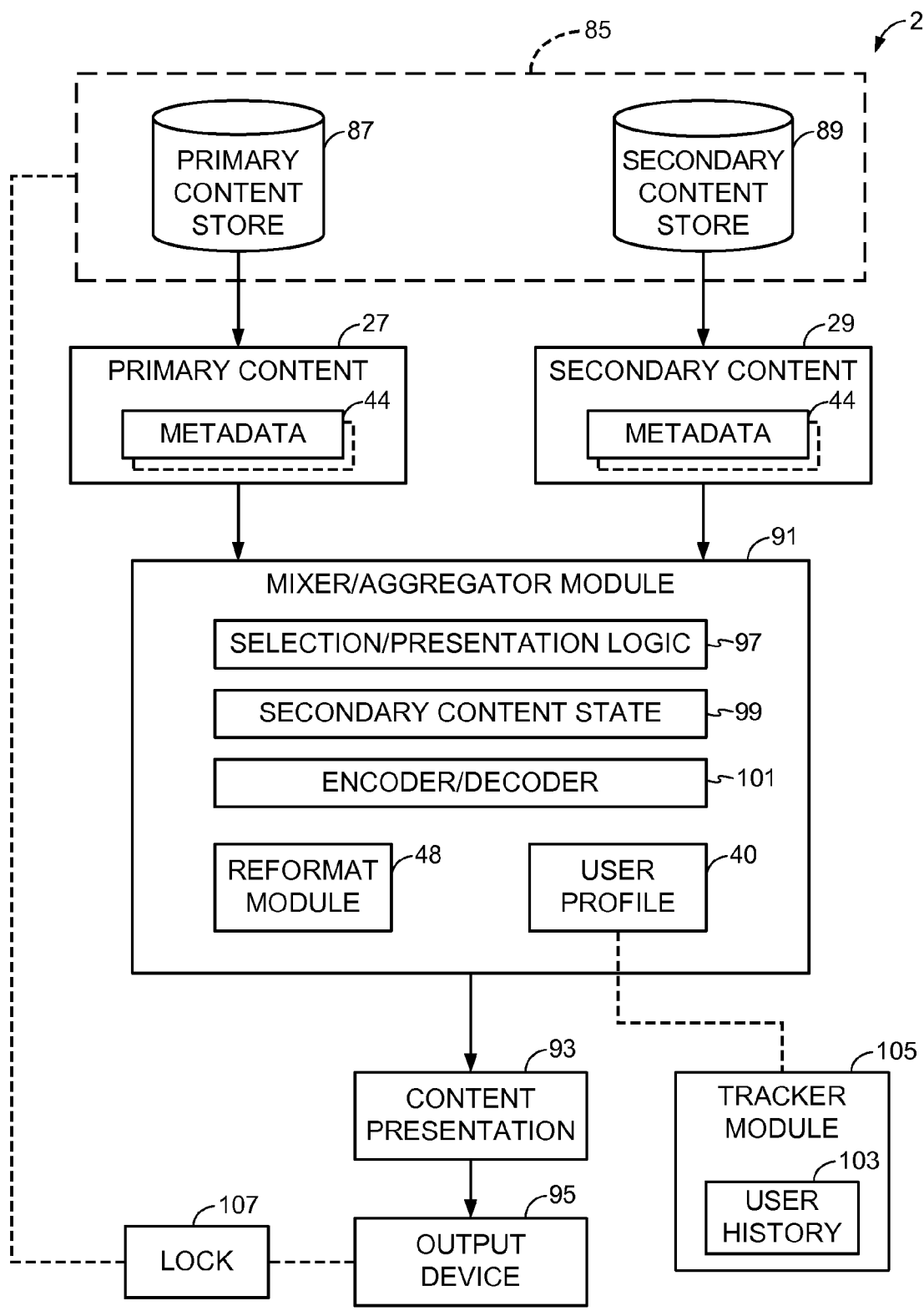
FIG. 6 is a schematic diagram of an aspect of various components of a wireless device of FIG. 1.

Referring to FIGS. 1 and 6, wireless communication device 26 may comprise one and/or a plurality of one or any combination of cellular phones, smart phones, laptops, handheld communication devices, handheld computing devices, satellite radios, global positioning systems, PDAs, and/or any other suitable device for communicating with media content distributor 22 over second communication link 32.

In one aspect, referring to FIG. 6, wireless communication device 26 may store media content 24 received from media content distributor 22 (FIG. 1) in a memory 85. For example, memory 85 may include a primary content store 87 and a secondary content store 89 that are respectively operable to store one or more primary content 27 and one or more secondary content 29. Further, wireless communication device 26 may include a mixer/aggregator module 91 executable with media management module 36 and operable to generate a content presentation 93 based on a selected primary content 27, and optionally further including one or more selected secondary content 29. Additionally, mixer/aggregator module 91 is operable to initiate generation of content presentation on output device 95, such as one or any combination of a visual output device such as a display, an audio output device such as speaker, a haptic feedback device such as a vibrator or raised element.

In some aspects, mixer/aggregator module 91 may include selection/presentation logic 97 executable to perform the functionality described herein. For example, selection/presentation logic 97 may select primary content 27 and/or secondary content 29 based on one or any combination of user inputs and/or based on a respective one or more content metadata 44 respectively associated with primary content 27 and secondary content 29. For example, content metadata 44 may dictate a characteristic of secondary content 29 required for a presentation with respect to primary content 27, such as a content type, size, etc. Further, for example, selection/presentation logic 97 may include algorithms, heuristics, fuzzy logic, and any other mechanism operable to allow mixer/aggregator module 91 to select content and generate content presentation 93. Additionally, in other aspects, selection/presentation logic 97 may randomly and/or systematically select secondary content 29 to be executed with respect to primary content 27. For example, mixer/aggregator module 91 may rotate through a given set of secondary content 29 available from secondary content store 89 to insure the user of the respective device experiences a minimal amount of content repetition.

In some aspects, prior to selecting one or more secondary content 29 for presentation relative to primary content 27, mixer/aggregator module 91 checks secondary content state 99 to verify whether or not to include secondary content 29. For example, secondary content state 99 may be user settable between a first or "on" value and a second or "off" value. The first or "on" value indicates to include secondary content 29, while the second or "off" value indicates to not include secondary content 29. In one use case, for example, a user may set secondary content state 99 to the first or "on" value in order to receive a discount, for example, on receiving the media content service, and/or on specific media content purchases, and/or on purchases or goods or services based on interactions with secondary content 29, and/or any other form of value received in exchange for receiving secondary content 29, such as advertisements.

Additionally, in some aspects, prior to selecting one or more secondary content 29 for presentation relative to primary content 27, mixer/aggregator module 91 may execute selection/presentation logic 97 to determine a match between some portion of user profile 40 and content metadata 44 of secondary content 29 in secondary content store 89, where the matching content is then selected for inclusion in content presentation 93.

As noted above, user profile 40 may include various user interactions with the device, device state information, applications being used, content presented and geographic location, etc., all of which may be compiled in a use history 103 by a tracker module 105. As such, tracker module 105 is operable to monitor actions occurring on and/or data generated by the respective device in order to provide information as to how the device is being used.

Further, in some aspects, mixer/aggregator module 91 may include reformat module 48, as discussed above with respect to FIG. 4. For example, reformat module 48 may change content from a first content state 45 (FIG. 4) to a second content state 47 (FIG. 5).

Additionally, in some aspects, mixer/aggregator module 91 may include an encoder/decoder 101 to encode/decode a format of primary content 27 and/or secondary content 29 to allow generation at output device 95. For example, encoder/decoder 101 may be operable on specific types of and/or portions of content, such as audio, video, text, graphics, images, etc.

Further, in some aspects, wireless device 26 may include a lock 107 that limits access to memory 85 and/or primary content storage 87 and/or secondary content storage 89. For example, lock 107 may comprise a software mechanism restricting access of an application, for example, based on a shared secret. In other examples, lock 107 may comprise an interrupt or roadblock between the content and a predetermined output, e.g. a one-way USB interface. As such, in some aspects, the problem of piracy is reduced by assuring that the wireless communication device 26 has no output port, such as either a serial port, a parallel port, and a wireless port, for data transfer to any other device. Additionally, in some aspects, the ability to perform an over-the-Air (OTA) data transfer may also be eliminated or reduced by assuring that media content are stored in special directories on the wireless communication device that do not allow file-copying or file-transmission through OTA means.

Referring still to FIGS. 1 and 6, in an aspect of a low end wireless device 26, processor 34 may comprise a low-cost single-chip with high-speed ARM-9 processors and encoder/decoder 101 may comprise AAC+ encoding/decoding techniques. The use of the single-chip processors lowers the cost of the wireless communication device 26. The use of AAC+ encoding/decoding significantly compacts the data-files.

Figure 7:
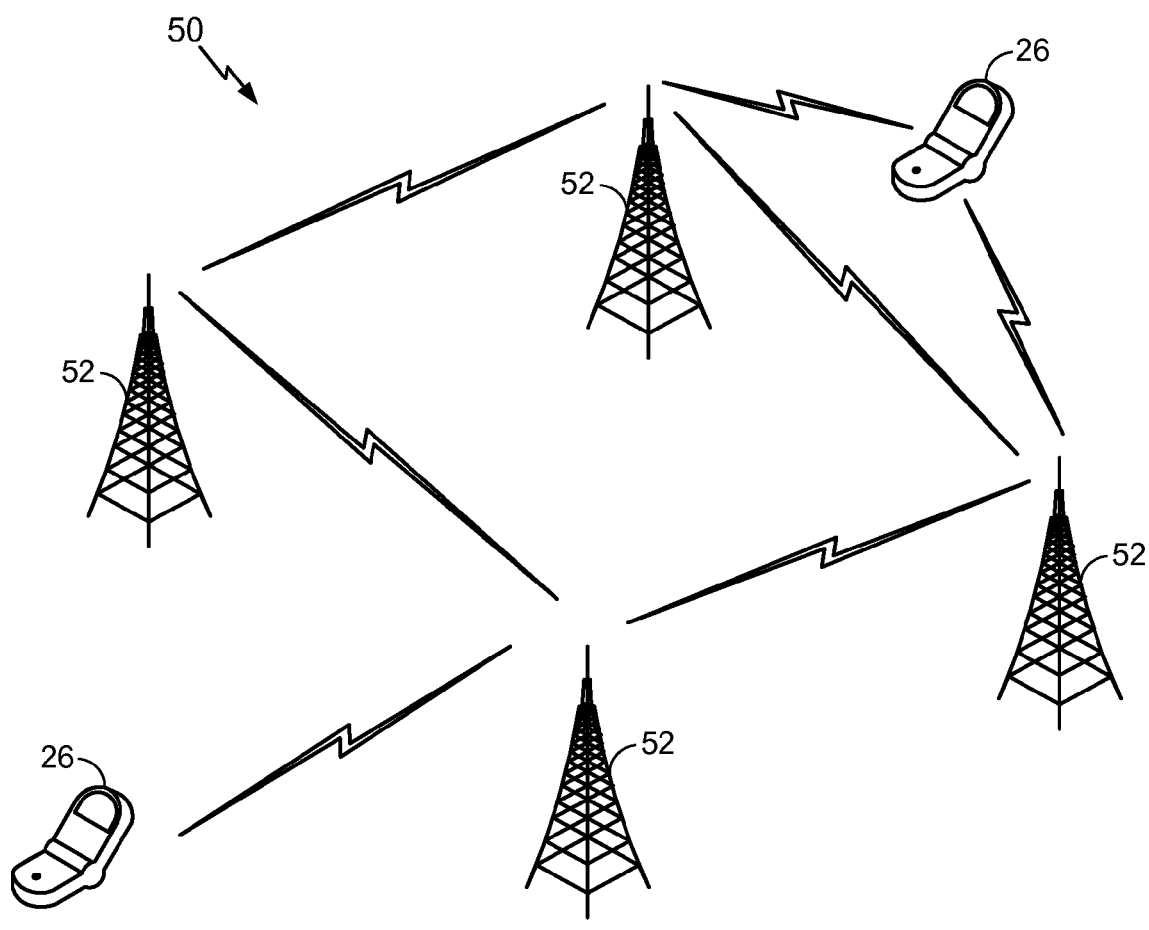
FIG. 7 illustrates a wireless network communication system in accordance with an aspect.

Referring to FIG. 7, a wireless network communication system 50 may comprise one or both of first communication link 30 (FIG. 1) and second communication link 32 (FIG. 1). System 50 can comprise one or more base stations 52 in one or more sectors that receive, transmit, repeat, etc., wireless communication signals to each other and/or to one or more mobile devices, such as wireless communication devices 26. Each base station 52 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile or wireless communication devices 26 can be any suitable device for communicating over system 50. System 50 can be employed in conjunction with various aspects described herein in order to facilitate delivering media content, such as music, to wireless communication devices.

Referring to FIGS. 1-11, the apparatus and methods described herein may be performed in an FDMA environment, an OFDMA environment, a CDMA environment, a WCDMA environment, a TDMA environment, an SDMA environment, a GSM environment, a GPRS environment, an EDGE environment, or any other suitable wireless environment. While, for purposes of simplicity of explanation, the methods are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 8:
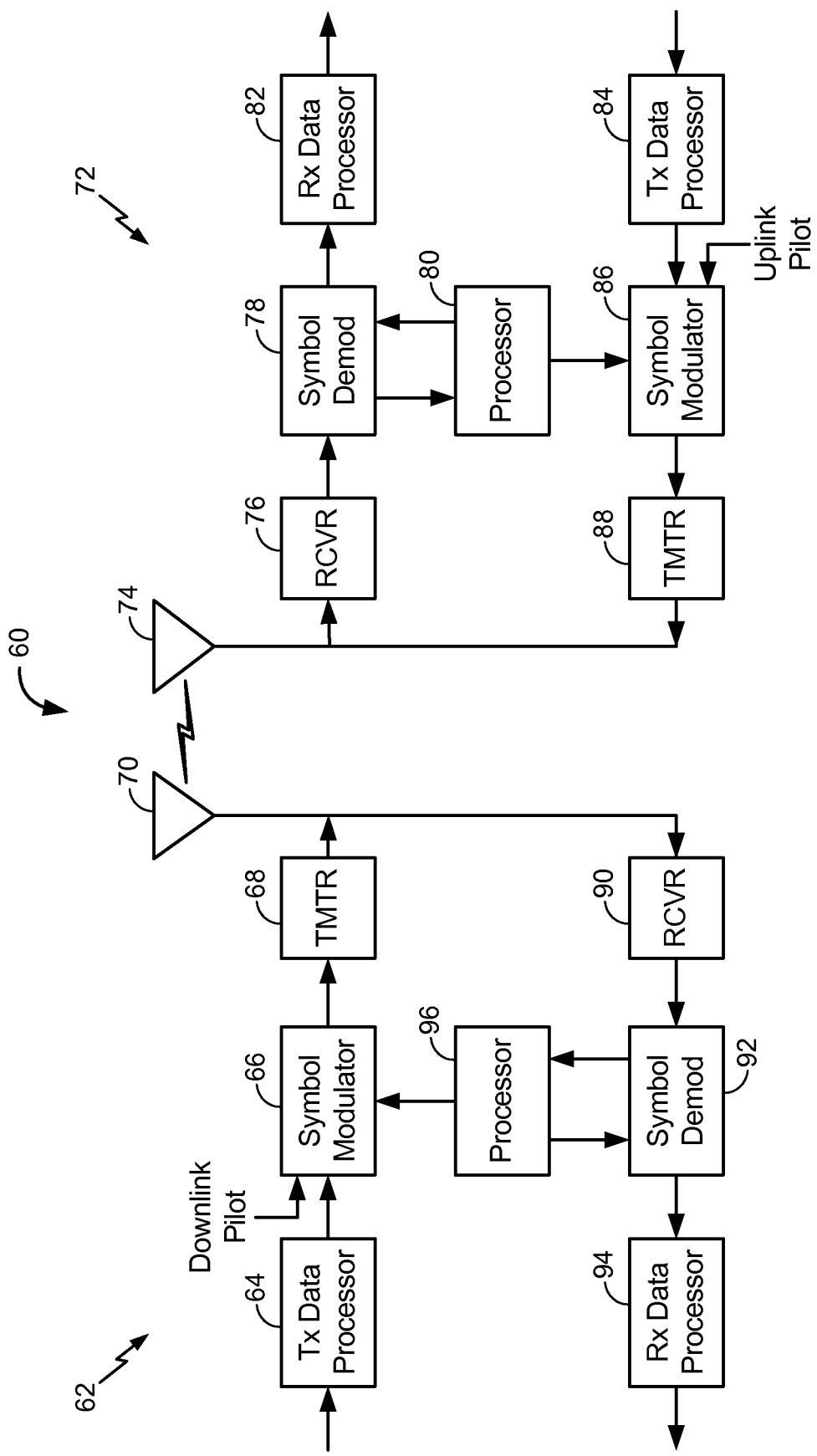
FIG. 8 illustrates a communication network that comprises a transport system that operates to create and transport multimedia content flows across data networks, in accordance with an aspect.

FIG. 8 is an illustration of a wireless network environment 60, in particular corresponding transmit and receive chains of communicating devices, which can be employed in system 20 (FIG. 1) in accordance with an aspect. At access point 62, a transmit (TX) data processor 64 receives, formats, codes, interleaves, and modulates (or symbol maps) traffic data and provides modulation symbols (data symbols). A symbol modulator 66 receives and processes the data symbols and pilot symbols and provides a stream of symbols. Further, symbol modulator 66 multiplexes data and pilot symbols and provides them to a transmitter unit (TMTR) 68. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 68 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 70 to a terminal. At terminal 72, an antenna 74 receives the downlink signal and provides a received signal to a receiver unit (RCVR) 76. Receiver unit 76 conditions (e.g., filters, amplifies, and frequency downconverts) the received signal and digitizes the conditioned signal to obtain samples. A symbol demodulator 78 demodulates and provides received pilot symbols to a processor 80 for channel estimation. Symbol demodulator 78 further receives a frequency response estimate for the downlink from processor 80, performs data demodulation on the received data symbols to obtain data symbol estimates (which are estimates of the transmitted data symbols), and provides the data symbol estimates to an RX data processor 82, which demodulates (i.e., symbol demaps), deinterleaves, and decodes the data symbol estimates to recover the transmitted traffic data. The processing by symbol demodulator 78 and RX data processor 82 is complementary to the processing by symbol modulator 66 and TX data processor 64, respectively, at access point 62.

On the uplink, a TX data processor 84 processes traffic data and provides data symbols. A symbol modulator 86 receives and multiplexes the data symbols with pilot symbols, performs modulation, and provides a stream of symbols. A transmitter unit 88 then receives and processes the stream of symbols to generate an uplink signal, which is transmitted by the antenna 74 to the access point 62.

At access point 62, the uplink signal from terminal 72 is received by the antenna 70 and processed by a receiver unit 90 to obtain samples. A symbol demodulator 92 then processes the samples and provides received pilot symbols and data symbol estimates for the uplink. An RX data processor 94 processes the data symbol estimates to recover the traffic data transmitted by terminal 72. A processor 96 performs channel estimation for each active terminal transmitting on the uplink. Multiple terminals may transmit pilot concurrently on the uplink on their respective assigned sets of pilot subbands, where the pilot subband sets may be interlaced.

Processors 96 and 80 direct (e.g., control, coordinate, manage, etc.) operation at access point 62 and terminal 72, respectively. Respective processors 96 and 80 can be associated with memory units (not shown) that store program codes and data. Processors 96 and 80 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 96 and 80.

Figure 9:
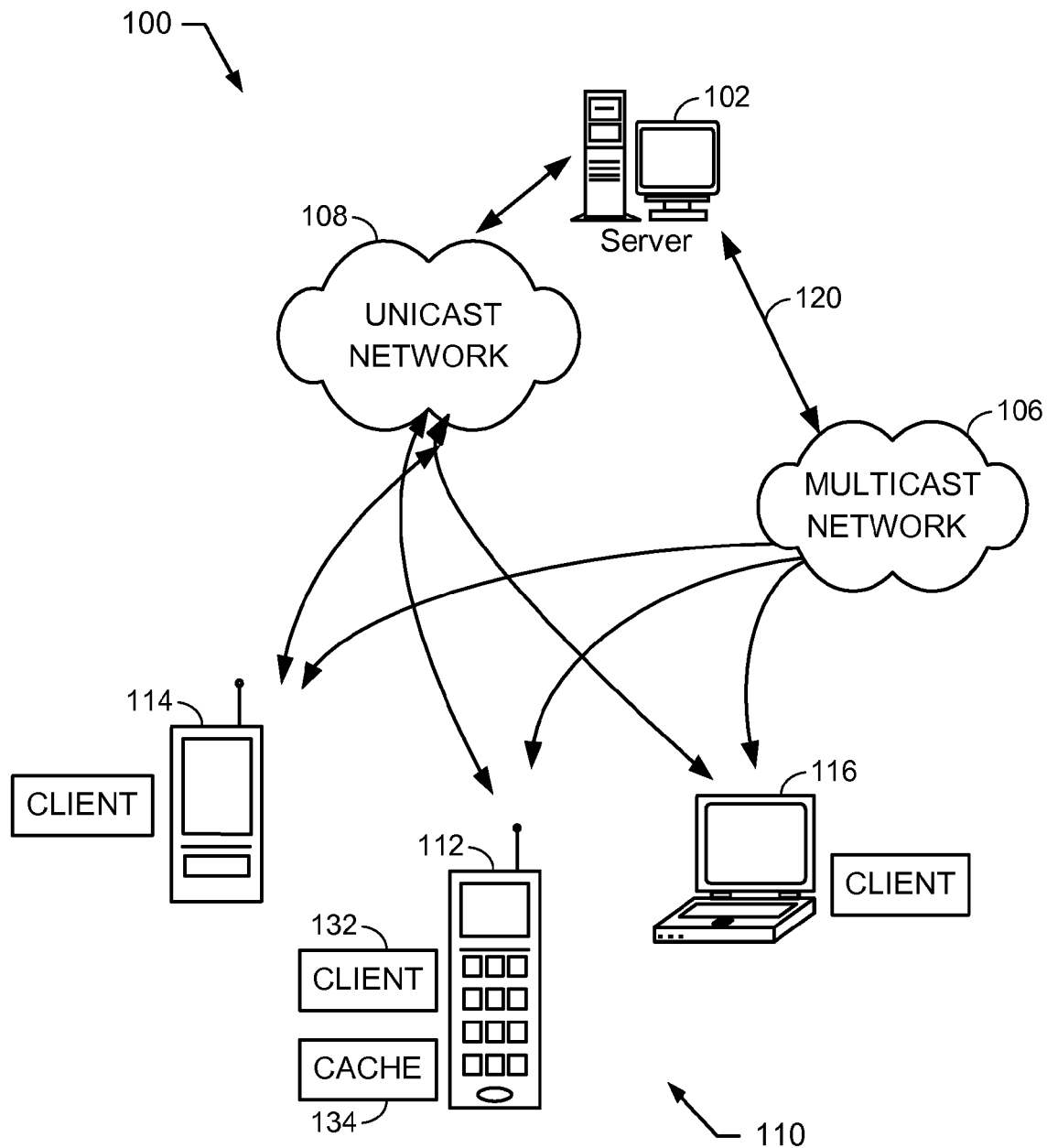
FIG. 9 illustrates various aspects of a content provider server suitable for use in a content delivery system.

FIG. 9 illustrates a communication network 100 that comprises a transport system that operates to create and transport multimedia content flows across data networks, which may be utilized in conjunction with system 20 in accordance with an aspect. For example, the transport system is suitable for use in transporting content from a server network to a wireless access network for broadcast distribution in combination with the unicast distribution provided by system 20. The network 100 comprises a server 102, which may comprise all or a portion of media content distributor 22, a multicast network 106, and a unicast network 108, both of which may comprise at least second communication link 32 of system 20. The network 100 also includes devices 110 that comprise a mobile telephone 112, a personal digital assistance (PDA) 114, and a notebook computer 116. The devices 110 illustrate just some of the devices that are suitable for use in one or more aspects of the transport system. It should be noted that although three devices are shown in FIG. 9, virtually any number and/or any type of devices are suitable for use in the transport system.

The server 102 operates to provide content for distribution to users in the network 100. The content comprises video, audio, multimedia content, clips, real-time and non real-time content, content clips, scripts, programs, data or any other type of suitable content. The server 102 provides the content to the multicast network 106 and/or the unicast network 108 for distribution. For example the server 102 communicates with the unicast network 108 via the communication link 118, which may comprise first communication link 30, and which can comprise any suitable type of wired and/or wireless communication link.

The network 100 comprises any combination of wired and wireless networks that operate to distribute content for delivery to users. The server 102 communicates with the multicast network 106 via the link 120. The link 120 comprises any suitable type of wired and/or wireless communication link. The multicast network 106 comprises any combination of wired and wireless networks that are designed to broadcast high quality content. For example, the multicast network 106 may be a specialized proprietary network that has been optimized to deliver high quality content to selected devices over a plurality of optimized communication channels, such as the MediaFLO™ network available from Qualcomm, Incorporated.

In one or more aspects, the transport system operates to deliver content from the server 102 through the multicast network 106 and the unicast network 108, to the devices 110. For example, content flow may comprise a non real-time content clip that was provided by the server 102 for distribution using the multicast network 106. In one aspect, the server 102 operates to negotiate with the multicast network 106 to determine one or more parameters associated with the content clip. Once the multicast network 106 receives the content clip, it broadcasts/multicasts the content clip over the network 100 for reception by one or more of the devices 110. Any of the devices 110 may be authorized to receive the content clip and cache it for later viewing by the device user.

For example, the device 110 comprises a client program 132 that operates to provide a program guide that displays a listing of content that is scheduled for broadcast over the network 100. The device user may then select to receive any particular content for rendering in real-time or to be stored in a cache 134 for later viewing. For example the content clip may be scheduled for broadcast during the evening hours, and the device 112 operates to receive the broadcast and cache the content clip in the cache 134 so that the device user may view the clip the next day. Typically, the content is broadcast as part of a subscription service and the receiving device may need to provide a key or otherwise authenticate itself to receive the broadcast.

Figure 10:
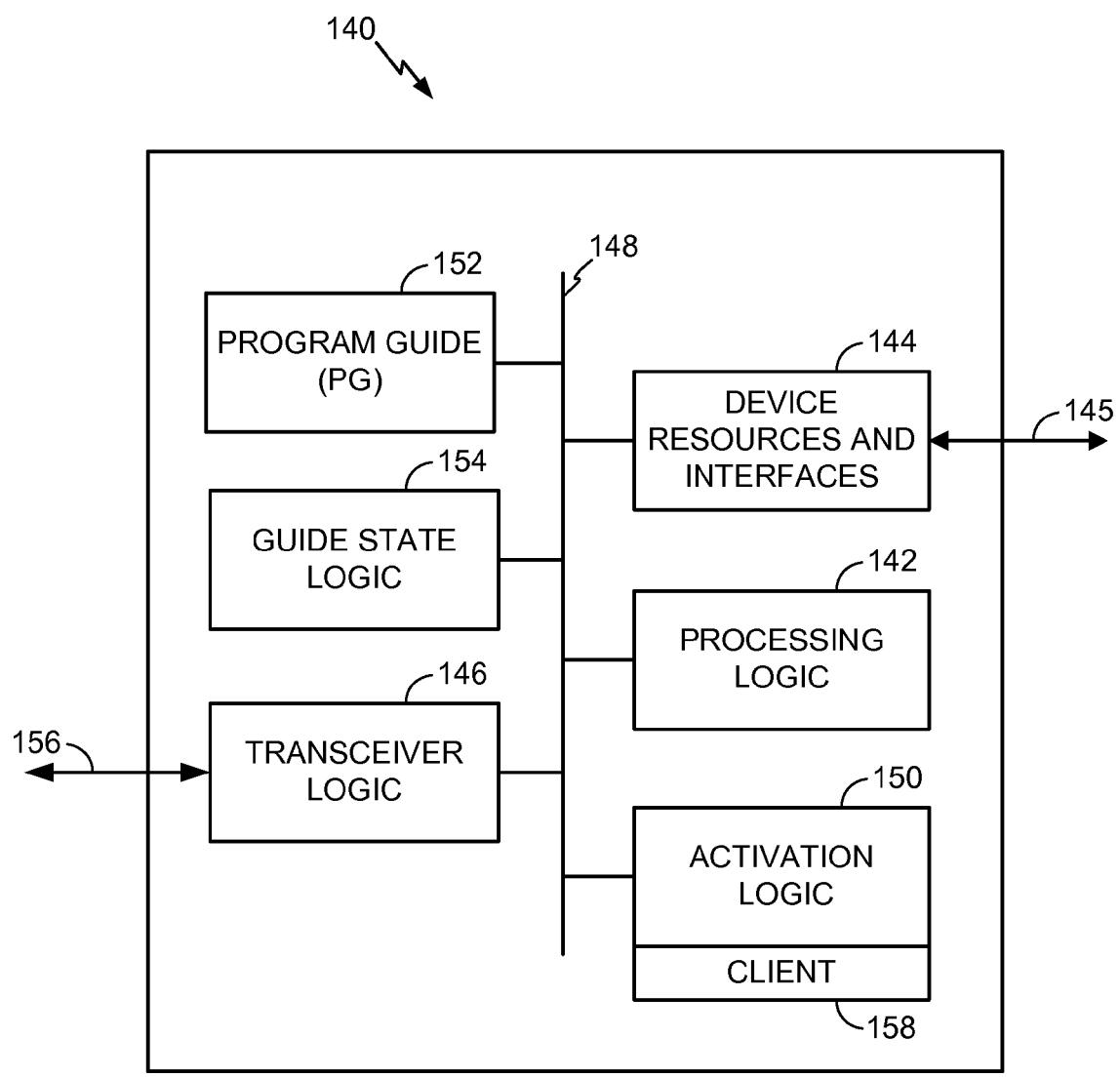
FIG. 10 illustrates a server or device suitable for use in a content delivery system, in accordance with an aspect.

FIG. 10 illustrates various aspects of a content provider server 140 suitable for use in a content delivery system, such as system 100 of FIG. 9 and in some aspects as a server for use by content provider 28 of system 20 of FIG. 1. The server 140 comprises processing logic 142, resources and interfaces 144, and transceiver logic 146, all coupled to an internal data bus 148. The server 140 also comprises activation logic 150, program guide (PG) 152, and PG records or state logic 154, which are also coupled to the data bus 148. In one or more aspects, the processing logic 142 comprises a CPU, processor, gate array, hardware logic, memory elements, virtual machine, software, and/or any combination of hardware and software. Thus, the processing logic 142 generally comprises logic to execute machine-readable instructions and to control one or more other functional elements of the server 140 via the internal data bus 148.

The resources and interfaces 144 comprise hardware and/or software that allow the server 140 to communicate with internal and external systems 145. For example, the internal systems may include mass storage systems, memory, display driver, modem, or other internal device resources. The external systems may include user interface devices, printers, disk drives, or other local devices or systems. The transceiver logic 146 comprises hardware logic and/or software that operates to allow the server 140 to transmit and receive data and/or other information with remote devices or systems using communication channel 156. For example, in one aspect, the communication channel 156 comprises any suitable type of communication link to allow the server 140 to communicate with a data network.

The activation logic 150 comprises a CPU, processor, gate array, hardware logic, memory elements, virtual machine, software, and/or any combination of hardware and software. The activation logic 150 operates to activate a server and/or a device to allow the server and/or the device to select and receive content and/or services described in the PG 152. In one aspect, the activation logic 150 transmits a client program 158, such as management module 38 (FIG. 1) and/or media management module 36 (FIG. 1), to the server and/or the device during the activation process. The client program 158 runs on the server and/or the device to receive the PG 152 and display information about available content or services to the device user. Thus, the activation logic 150 operates to authenticate a server and/or a device, download the client program 158, and download the PG 152 for rendering on the device by the client program 158.

The PG 152 comprises information in any suitable format that describes content and/or services that are available for devices to receive. For example, the PG 152 may be stored in a local memory of the server 140 and may comprise information such as content or service identifiers, scheduling information, pricing, and/or any other type of relevant information. In one aspect, the PG 152 comprises one or more identifiable sections that are updated by the processing logic 142 as changes are made to the available content or services.

The guide state/records logic 154 comprises hardware and/or software that operates to generate notification messages that identify and/or describe changes to the PG 152. For example, when the processing logic 142 updates the PG 152, the PG records logic 154 is notified about the changes. The PG state/records logic 154 then generates one or more notification messages that are transmitted to servers, which may have been activated with the server 140, so that these servers are promptly notified about the changes to the PG 152.

In various aspects, as part of the content delivery notification message, a broadcast indicator is provided that indicates when a section of the PG identified in the message will be broadcast. For example, in one aspect, the broadcast indicator comprises one bit to indicate that the section will be broadcast and a time indicator that indicates when the broadcast will occur. Thus, the servers and/or the devices wishing to update their local copy of the PG records can listen for the broadcast at the designated time to receive the updated section of the PG records. In one aspect, the content delivery notification system comprises program instructions stored on a computer-readable media, which when executed by a processor, for instance, the processing logic 142, provides the functions of the server 140 described herein. For example, the program instructions may be loaded into the server 140 from a computer-readable media, such as a floppy disk, CDROM, memory card, FLASH memory device, RAM, ROM, or any other type of memory device or computer-readable media that interfaces to the server 140 through the resources 144. In another aspect, the instructions may be downloaded into the server 140 from an external device or network resource that interfaces to the server 140 through the transceiver logic 146. The program instructions, when executed by the processing logic 142, provide one or more aspects of a guide state notification system as described herein.

Figure 11:
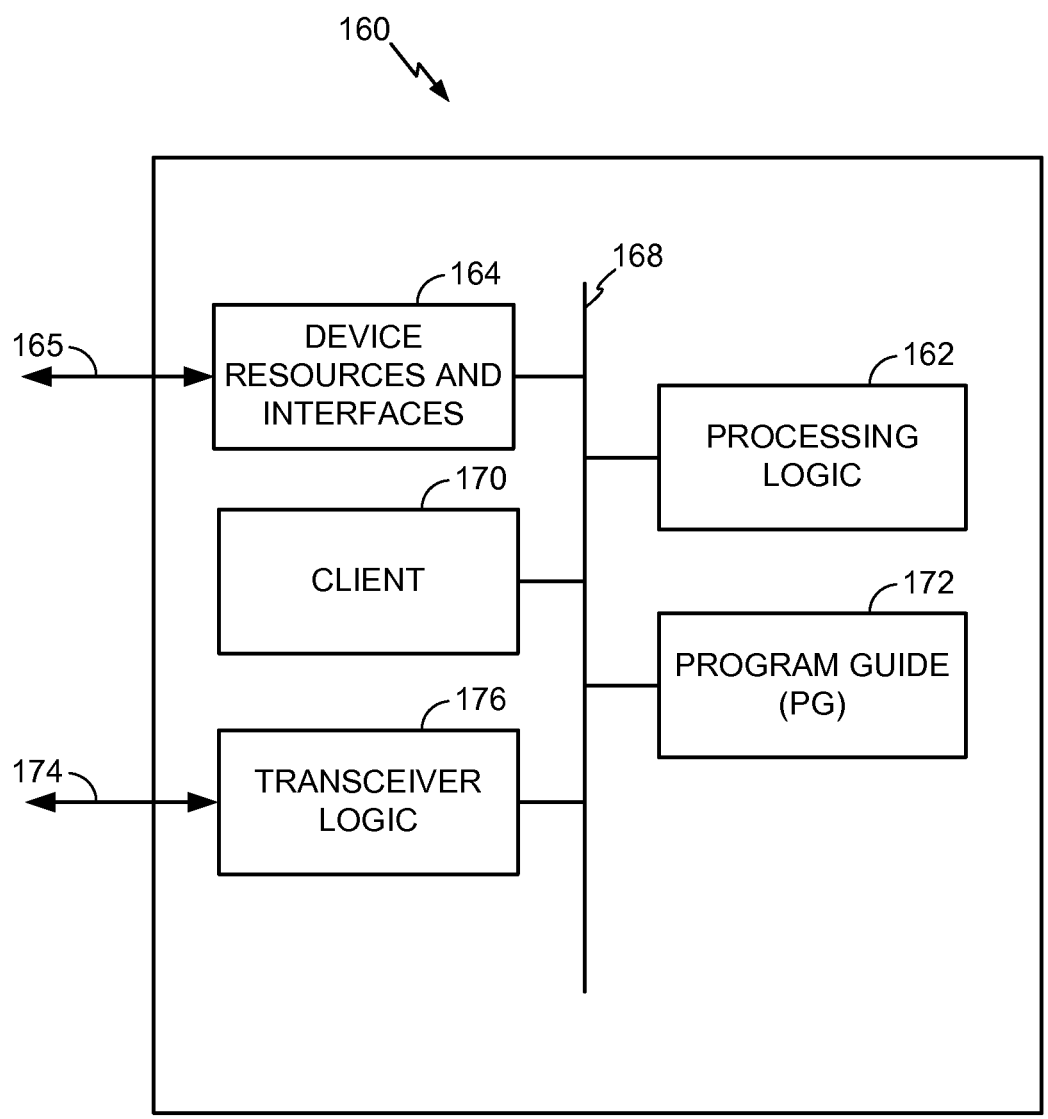
FIG. 11 illustrates a detailed block diagram of an audio delivery system in accordance with an aspect.

FIG. 11 illustrates a server or device 160 suitable for use in a content delivery system, in accordance with an aspect. For example, server and/or the device 160 may be the server 102 or the device 110 shown in FIG. 9. In other aspects, for example, aspects of server or device 160 may be present in wireless device 26 of system 20 of FIG. 1. The server and/or the device 160 comprises processing logic 162, resources and interfaces 164, and transceiver logic 166, all coupled to a data bus 168. The server and/or the device 160 also comprises a client 170, and a PG module 172, which are also coupled to the data bus 168. In one or more aspects, the processing logic 162 comprises a CPU, processor, gate array, hardware logic, memory elements, virtual machine, software, and/or any combination of hardware and software. Thus, the processing logic 162 generally comprises logic configured to execute machine-readable instructions and to control one or more other functional elements of the server and/or the device 160 via the internal data bus 168.

The resources and interfaces 164 comprise hardware and/or software that allow the server and/or the device 160 to communicate with internal and external systems. For example, internal systems may include mass storage systems, memory, display driver, modem, or other internal device resources. The external systems may include user interface devices, printers, disk drives, or other local devices or systems. The transceiver logic 166 comprises hardware and/or software that operate to allow the server and/or the device 160 to transmit and receive data and/or other information with external devices or systems through communication channel 174. For example the communication channel 174 may comprise a network communication link, a wireless communication link, or any other type of communication link.

During operation, the server and/or the device 160 is activated so that it may receive available content or services over a data network. For example, in one aspect, the server and/or the device 160 identifies itself to a content provider server during an activation process. As part of the activation process, the server and/or the device 160 receives and stores PG records by PG module 172. The PG 172 contains information that identifies content or services available for the server and/or the device 160 to receive. The client 170 operates to render information in the PG module 172 on the server and/or the device 170 using the resources and interfaces 164. For example, the client 160 renders information in the PG module 172 on a display screen that is part of the server and/or the device. The client 170 also receives user input through the resources and interfaces so that a device user may select content or services.

In some aspects, the server and/or the device 160 receives notification messages through the transceiver logic 176. For example, the messages may be broadcast or unicast to the server and/or the device 160 and received by the transceiver logic 176. The PG notification messages identify updates to the PG records at the PG module 172. In one aspect, the client 170 processes the PG notification messages to determine whether the local copy at the PG module 172 needs to be updated. For example, in one aspect, the notification messages include a section identifier, start time, end time, and version number. The server and/or the device 160 operates to compare the information in the PG notification messages to locally stored information at the existing PG module 172. If the server and/or the device 160 determines from the PG notification messages that one or more sections of the local copy at the PG module 172 needs to be updated, the server and/or the device 160 operates to receive the updated sections of the PG in one of several ways. For example, the updated sections of the PG may be broadcasted at a time indicated in the PG notification messages, so that the transceiver logic 176 may receive the broadcasts and pass the updated sections to the server and/or the device 160, which in turn updates the local copy at the PG module 172.

In other aspects, the server and/or the device 160 determines which sections of the PG need to be updated based on the received PG update notification messages, and transmits a request to a content provider (CP) server to obtain the desired updated sections of the PG. For example, the request may be formatted using any suitable format and comprise information such as a requesting server identifier, section identifier, version number, and/or any other suitable information. In one aspect, the server and/or the device 160 performs one or more of the following functions in one or more aspects of a PG notification system. It should be noted that the following functions might be changed, rearranged, modified, added to, deleted, or otherwise adjusted within the scope of the aspects. The server and/or the device may be activated for operation with a content provider system to receive content or services. As part of the activation process, a client and PG are transmitted to the server and/or the device. One or more PG notification messages may be received by the server and/or the device and used to determine if one or more sections of the locally stored PG need to be updated. In one aspect, if the server and/or the device determines that one or more sections of the locally stored PG need to be updated, the server and/or the device listens to a broadcast from the distribution system to obtain the updated sections of the PG that it needs to update its local copy. In another aspect, the server and/or the device transmits one or more request messages to the CP to obtain the updated sections of the PG it needs. In response to the request, the CP transmits the updated sections of the PG to the server and/or the device. The server uses the received updated sections of the PG to update its local copy of the PG.

According to still other aspects, the content delivery system comprises program instructions stored on a computer-readable media, which when executed by a processor, such as the processing logic 162, provides the functions of the content delivery notification system as described herein. For example, instructions may be loaded into the server 160 from a computer-readable media, such as a floppy disk, CDROM, memory card, FLASH memory device, RAM, ROM, or any other type of memory device or computer-readable media that interfaces to the server 160 through the resources and interfaces 164. In another aspect, the instructions may be downloaded into the server 160 from a network resource that interfaces to the server 160 through the transceiver logic 176. The instructions, when executed by the processing logic 162, provide one or more aspects of a content delivery system as described herein. It should be noted that the server 160 represents just one implementation and that other implementations are possible within the scope of the aspects.

Figure 12:
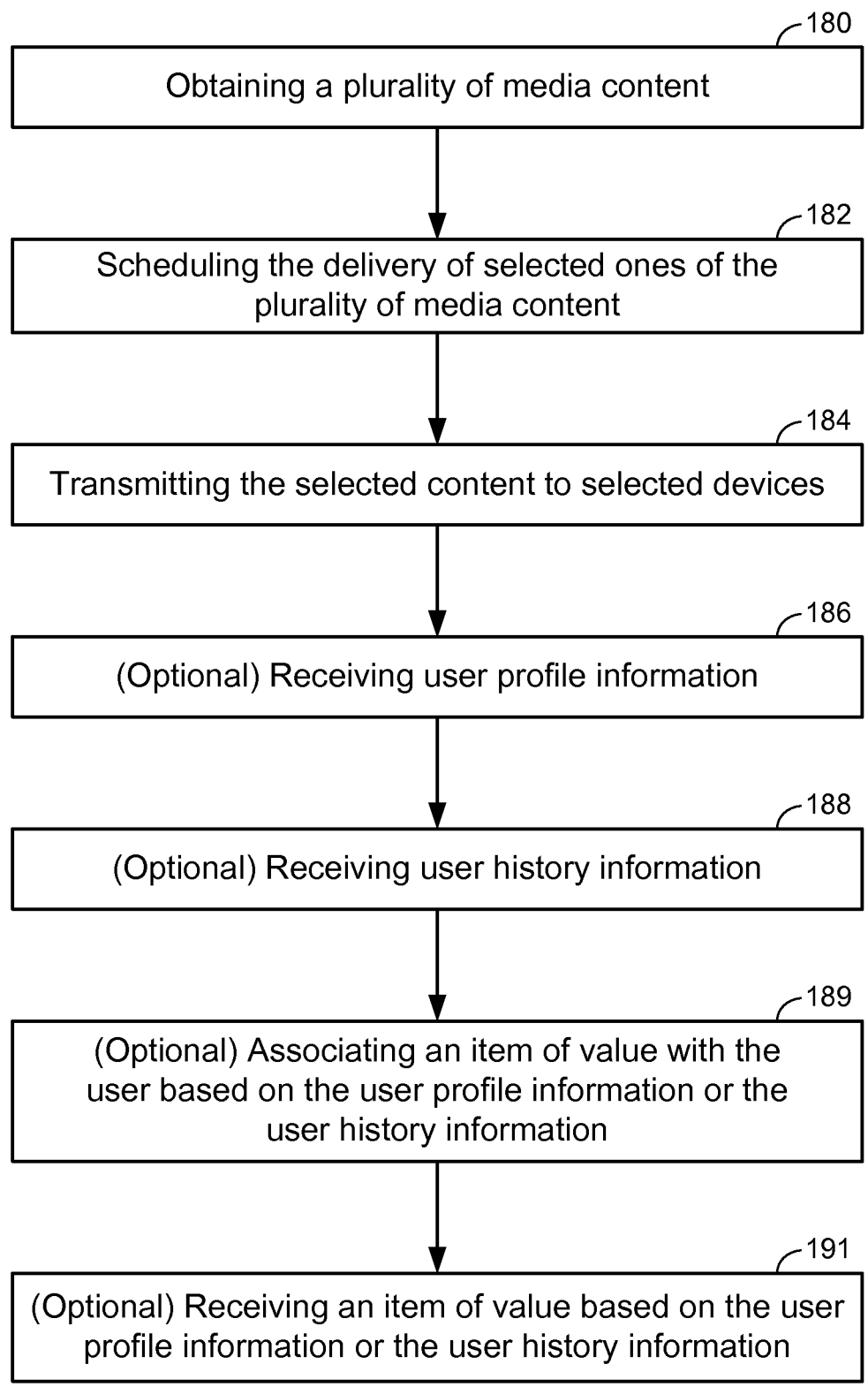
FIG. 12 is a flowchart of one aspect of a network-based method.

In operation of the network side of system 20 (FIG. 1), referring to FIG. 12, one aspect of a method of distributing media content comprises obtaining a plurality of media content (Block 180). For example, in one aspect, media content distributor 22 may receive a plurality of media content 24 from one or more content providers 28. Further, in some aspects, each piece of media content 24 may comprise either primary media content 27 or secondary media content 29.

Further, the method includes scheduling the delivery of selected ones of the plurality of media content (Block 182). For example, in one aspect, management module 38 and/or distribution module 46 may generate a content distribution schedule 81 for secondary content 29. For example, management module 38 and/or distribution module 46 may execute predetermined algorithms, fuzzy logic, heuristics, etc., in order to determine what content to send to what device, for example, based on network capacity, the number of devices included in the schedule, the memory size of the secondary content, and any other relevant distribution parameters.

Additionally, the method includes transmitting the selected content to selected devices (Block 184). For example, in one aspect, distribution module 46 transmits selected secondary content 29 to one or more devices, such as wireless devices 26 and/or terminals 75, based on content distribution schedule 81. For example, distribution module 46 may compress secondary content 29 and then transmit it over one or more communication networks, such as network 32, to the devices.

In some optional aspects, the method may include receiving user profile information (Block 186). For example, media content distributor 22 may receive user profile 40 corresponding to one or more users of devices operating within system 20. For example, management module 38 and/or distribution module 46 may determine selected secondary content to transmit to a device based on a match between content metadata 44 and user profile 40.

In another optional aspect, the method may include receiving user history information (Block 188). For example, in some aspect, media content distributor 22 may receive user history information 103 from tracker module 105 executing on wireless device 26. User history information 103 may provide a myriad of data that allows for a correlation between, for example, user activity and device state information. Further, in some aspect, user history information 103 may comprise data relating to the user interaction with one or more interactive elements 35 of secondary content 29, which may be of interest to advertisers, marketing personnel, etc.

Further, and also optionally, the method may include associating an item of value with the user based on the user profile information or the user history information (Block 189). For example, media content distributor 22, content provider 28, advertiser, etc., may transmit an item of value to a respective device, or credit an account of the user. Further, for example, data that tracks user interactivity with secondary content 29 may be used to determine fees, discounts, etc. to reduce costs of the user of the respective device.

Further, and also optionally, the method may include receiving an item of value based on the user profile information or the user history information (Block 191). For example, media content distributor 22 may receive value from content provider 28, advertiser, etc. Further, for example, data that tracks user interactivity with secondary content 29 may be used to determine fees, discounts, etc. to reduce costs of the operator of system 20.

Figure 13:
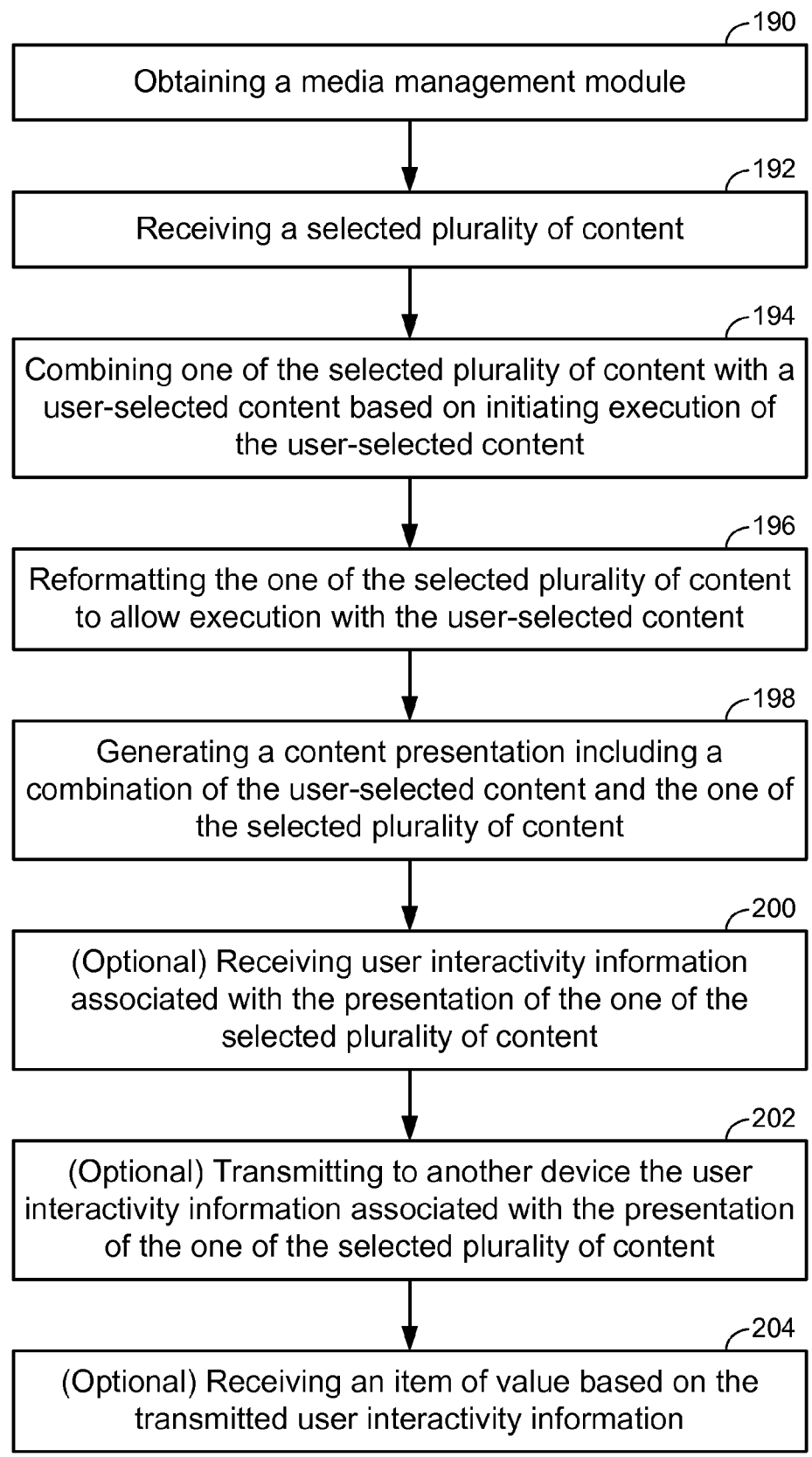
FIG. 13 is a flowchart of one aspect of a device-based method.

In operation of the device side of system 20, referring to FIG. 13, one aspect of a method of receiving and managing content comprises obtaining a media management module (Block 190). For example, wireless device 26 may obtain media management module 36 at the time of manufacture, and/or via download from media content distributor, and/or via a hard-wired connection.

The method further includes receiving a selected plurality of one or more pieces of content (Block 192). For example, in one aspect, the selected plurality may comprise secondary content 29, and is determined by management module 38 and/or distribution module 38 as described above.

Further, the method includes combining one of the selected plurality of content with a user-selected piece of content based on initiating execution of the user-selected piece of content (Block 194). For example, media management module 36 may receive a user input to play primary content 27 stored on the respective device, or received via network 32 such as streaming content. Additionally, mixer/aggregator module 91 executes to determine appropriate secondary content 29 stored in secondary content store 89 to associate with primary content 27 to thereby generate content presentation 93. In some aspects, mixer/aggregator module 91 checks secondary content state 99, which dictates whether or not to include secondary content 29, before attempting to find appropriate secondary content 29.

Additionally, in some aspects, the method includes reformatting the one of the selected plurality of content to allow execution with the user-selected piece of content (Block 196). For example, mixer/aggregator module 91 may execute reformat module 48, for example, to resize and/or reshape the selected secondary content 29 based on content metadata 44 of primary content 27, where the content metadata may define markers 49 and/or 51.

Further, the method includes generating a content presentation including a combination of the user-selected piece of content and the one of the selected plurality of content (Block 198). For example, the mixer/aggregator module 91 initiates generation of content presentation 93 on output device 95.

Optionally, the method includes receiving user interactivity information associated with the presentation of the one of the selected plurality of content (Block 200). For example, tracker module 105 collects user history 103, which may be sent to media content distributor 22 directly or as part of user profile 40.

Optionally, the method may further include transmitting the user interactivity information associated with the presentation of the one of the selected plurality of content to another device (Block 202). For example, media management module 36 may forward user history 103, or user profile 40 including user history 103, to media content distributor 22.

Optionally, the method may further include receiving an item of value based on the transmitted user interactivity information (Block 204). For example, in some aspects, based on user history 103, the user of the respective device may receive discounts, coupons, monetary rewards, credits, etc.

Thus, in an aspect, system 20 (FIG. 1) provides an intelligent combination of unicast-based push and pull techniques (including OTA and one-way parallel connections) are utilized for downloading media content, such as one or any combination of songs, music clips and advertisements, to users' handsets. As such, media content may be pushed in a synchronous (time-based delivery) or asynchronous (need based delivery) manner through a unicast or multicast network. In an aspect, custom design of the wireless communication device eliminates files transfer from the handset to the external world. The pushed media content, such as audio clips, may vary from wireless communication device to wireless communication device based on the profile of the end-user and his/her particular preference for a specific genre. The downloaded data-files (received through the push or pull connection) are stored on the wireless communication device memory. When the wireless communication device memory is full, old media content, such as songs, are deleted to make room for new content to be downloaded. However, the entire purchase history of the user may be retained on the server and a previously deleted piece of media content can be retrieved from the server, as needed.

System 20 (FIG. 1) may be configured as a low end, e.g. low cost and/or low technology, media delivery system, as compared to a state-of-the-art content delivery system. For example, a state-of-the-art media content delivery system may be a system such as, or comparable to, a 1x Evolution-Data Optimized (EVDO) standard network distributing "near CD quality" MP3 formatted music files. Further, for example, the data transfer rate of an EVDO or other comparable state-of-the-art network may be about 1.5 Mbps to about 2.5 Mbps, which may include an average data transfer rate of about 400 kbps to about 600 kbps. Additionally, for example, in a system operating based on prevailing standards, a piece of media content such as a music file typically is encoded and compressed at a 64 kbps-256 kbps rate in the MP3 format for a "near CD quality" music file.

In contrast, low cost aspects of system 20 may include a low end, low cost, older technology, lower data throughput, and/or lower data bandwidth network such as, or comparable to, a GPRS network, an EDGE network and/or 1X network. Such a delivery network, for example which comprises second communication link 32 (FIG. 1), may have a relatively low data throughput rate, such as a peak data transfer rate of about 140 kbps to about 160 kbps and an average data throughput rate of about 40 kbps to about 50 kbps. In particular, system 20 may include one or any combination of: media content 24 transferred and stored in a relatively highly compressed format, such as utilizing a 32 kilobits per second (kbps) Advanced Audio Coding+ (AAC+) encoding and compression format for a "near CD quality" music file. Additionally, a low end or low cost aspect of system 20 may include wireless devices 26 comprising processor 34 having a low cost, single chip configuration incorporating baseband, radio transceiver and power management logic into the single chip.

Additionally, in a low end configuration, aspects of system 20 may further comprise one or any combination of the following attributes:

- A white-labeled, e.g. labeled under the carrier's own brand-name, music service bundled with a specially designed wireless device, also referred to as a handset, and offered by the carriers or service providers (with whom they team up).
- The media management module may be pre-installed on the handset. The service can be invoked by the user by pressing a button on the handset, and/or also through predetermined menus.
- The users may register their favorite genre at the time of purchase, which may be stored in the user profile. The users may change it or make additions to it at any time.
- The stored music may include clips (about 30-40 seconds in length) and full-track songs. The former may be in the format of 16 kbps, AAC+ (mono) and the latter may be in 32 kbps AAC+ (stereo) format.

Full-Track Music Download

- Full song purchase on demand at a predetermined price per song, where the price may be determined by the operator. The user-demand is sent from the user's handset to the operator's server, and subsequently the song is downloaded over-the-air.
- The selection of the song to be purchased may be made either from stored clips or from a catalog displayed on the screen of the handset. The catalog may be downloaded on demand.
- The music catalog may be categorized by one or any combination of Artist, Album and Genre, and/or any predetermined category.
- Conversion to ringtones from the stored full-track songs or clips, may be offered, such as on-demand at a price to be determined by the operator. Ringtones may be in the same AAC+ format as the clips.
- Artist's Image (or Image of an Album Cover) and the lyrics (for Karaoke) may be displayed on the screen while the full-track song is being played. A slider may be provided to slide the screen up or down to see previous lyrics or next lyrics.
- Search Engine: Music-Search through a catalog of available songs and local search through the list of downloaded songs on the handset. Searching for Songs from a Content Catalog through a Browser may be provided.
- Gifting of full-track songs or clips to friends may be provided through re-purchase of the song, which song may be subsequently forwarded from the media content distributor or service provider server to the friend's handset. Different prices may be charged by the operators for songs or clips.
- All downloaded songs and clips may be operable to be played from the native music player of the handset without invoking the music delivery service.

Clip-Casting

- Free Clip-Casting: a predetermined number of music clips (each about 30-40 seconds in length) may be pushed to the end-user every day, for example, during off-peak hours. The free clip may be provided by the content provider, such as a music labels, as a free promotion.
- The scheduled time of content-push (which may be prefixed and built into the handset) may vary from user to user. The pushed clip (audio and the text of the title of the song, name of the artist and the sponsor) may vary from user to user depending on the profile selected by the user. Users with the same profile may get the same pushed content. After receiving the content, the user can download the information about that particular song and/or artist through one click.
- In some optional aspects: The server does not care if the clip-casting was duly received by the user or not. No receipt confirmation is made. Even if the clip-push was not successful, no retrial may be made.
- At the time of clip-casting, if the handset memory is full, the oldest clip, as opposed to a full-track song, may be automatically pushed out, e.g. deleted. In some aspects, however, except for a clip that is specially marked, such as "save," by the user. In some aspects, any specially marked clip may not be deleted, rather, it is saved on the handset until the user decides to delete it.
- Clip to full-track conversion by the end-user at a predetermined price per song, which may be offered on-demand. This process may comprise transmitting a full-track song (e.g. AAC+ 32 k stereo format) to the user's handset and pushing out the clip.

Advertisements

- Mobile Advertisements: May include text message with sponsorship information at any time the media management module is activated. In some aspects, a moving color graphics with animation may be shown on the screen at the time any pushed clip is listened to by the user. The same may be also shown during the time any purchased full song is downloaded. In some aspects, no message/graphic may be shown when any purchased full song is listened to by the user, e.g. the screen display may be saved for the lyrics.
- A new set of ads may be downloaded to the handset at an interval that is agreed upon by the operator/service provider/media content distributor and the advertiser, for example, in the same manner as the free clip download. However, in some aspects, in order to track ad usage, the confirmation of the receipt and retry (if necessary) may be made for ad downloads.

Optional Download from PCs

- Optional download of content from PCs or other digital equipment which supports AAC+, e.g. through a USB interface. The content downloaded through USB may be separately marked as non-purchased songs and stored in a different directory.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may be defined in a computer program product residing as a computer readable medium having one or any combination or set of codes operable to cause a computer to implement the steps and/or actions.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of receiving and managing content on a device, comprising:
   receiving a plurality of secondary content;
   selecting a primary content based on user input;
   selecting one of the plurality of secondary content when a secondary content state associated with the device comprises a value comprising an indication to include the secondary content, wherein the one of the plurality of secondary content is selected based on an algorithm operable to minimize a repeat presentation of the one of the plurality of secondary content;
   combining the selected one of the plurality of secondary content with the primary content, wherein the primary content comprises a marker defining a presentation attribute of the primary content and the secondary content;
   reformatting the one of the plurality of secondary content based on the marker by changing a content generation characteristic of the one of the plurality of secondary content, wherein the one of the plurality of secondary content is reformatted from a first content format to a second content format, and wherein the first content format corresponds to a first content display shape and the second content format corresponds to a second content display shape different from the first content display shape;
   generating a content presentation including a combination of the primary content and the reformatted one of the plurality of secondary content; and
   displaying the content presentation such that the primary content is simultaneously displayed with the reformatted one of the plurality of secondary content within a viewable space on a display of the device, the reformatted one of the plurality of secondary content being displayed in a format different from that of the primary content;
   wherein the selecting of one of the plurality of secondary content is based on a user profile associated with the device, wherein the user profile includes static and dynamic information, and wherein the dynamic information includes a current position location information of the user and behavior information of the user related to the device.

2. The method of claim 1, wherein the changing of the content generation characteristic further comprises changing at least one of a content size, a content shape, a content protocol, a content color characteristic, and a content sound characteristic.

3. The method of claim 1, wherein reformatting further comprises determining the second content display shape based on the marker.

4. The method of claim 1, wherein the reformatting further comprises determining placement of the one of the plurality of secondary content relative to the primary content on a display of the device based on the marker.

5. The method of claim 1, wherein the one of the plurality of secondary content comprises an interactive element, further comprising tracking a user input in response to the interactive element in a user history, and selecting a next one of the plurality of secondary content based on the user history.

6. The method of claim 1, wherein the one of the plurality of secondary content comprises an interactive element, further comprising tracking a user input in response to the interactive element in a user history, forwarding the user history to another device, and receiving an association of an item of value with the device based on the forwarded user history.

7. The method of claim 1, wherein the one of the plurality of secondary content comprises at least one of a coupon and an advertisement, further comprising storing the one of the plurality of secondary content including the at least one of the coupon and the advertisement in a memory of the device.

8. The method of claim 1, further comprising connecting to a wireless communications network having a peak data rate of less than about 160 kilobits per second (kbps), and wherein receiving further comprises receiving each of the plurality of secondary content in a compressed format of less than about 64 kbps.

9. At least one processor configured to perform the actions of:
- receiving a plurality of secondary content;
- selecting a primary content based on user input;
- selecting one of the plurality of secondary content when a secondary content state associated with a device comprises a value comprising an indication to include the secondary content, wherein the one of the plurality of secondary content is selected based on an algorithm operable to minimize a repeat presentation of the one of the plurality of secondary content;
- combining the selected one of the plurality of secondary content with the primary content, wherein the primary content comprises a marker defining a presentation attribute of content;
- reformatting the one of the plurality of secondary content based on the marker by changing a content generation characteristic of the one of the plurality of secondary content, wherein the one of the plurality of secondary content is reformatted from a first content format to a second content format, and wherein the first content format corresponds to a first content display shape and the second content format corresponds to a second content display shape different from the first content display shape;
- generating a content presentation including a combination of the primary content and the reformatted one of the plurality of secondary content; and
- displaying the content presentation such that the primary content is simultaneously displayed with the reformatted one of the plurality of secondary content within a viewable space on a display of the device, the reformatted one of the plurality of secondary content being displayed in a format different from that of the primary content,
- wherein the selecting of one of the plurality of secondary content is based on a user profile associated with the device, wherein the user profile includes static and dynamic information, and wherein the dynamic information includes a current position location information of the user and behavior information of the user related to the device.

10. A computer program product, comprising:
a non-transitory computer readable medium, comprising:
- a first set of codes operable to cause a computer to receive a plurality of secondary content;
- a second set of codes operable to cause the computer to select a primary content based on user input;
- a third set of codes operable to cause the computer to selecting one of the plurality of secondary content when a secondary content state associated with a device comprises a value comprising an indication to include the secondary content, wherein the one of the plurality of secondary content is selected based on an algorithm operable to minimize a repeat presentation of the one of the plurality of secondary content;
- a fourth set of codes operable to cause the computer to combine the selected one of the plurality of secondary content with the primary content, wherein the primary content comprises a marker defining a presentation attribute of the primary content and the secondary content;
- a fifth set of codes operable to cause the computer to reformat the one of the secondary plurality of content based on the marker by changing a content generation characteristic of the one of the plurality of secondary content, wherein the one of the plurality of secondary content is reformatted from a first content format to a second content format, and wherein the first content format corresponds to a first content display shape and the second content format corresponds to a second content display shape different from the first content display shape;
- a sixth set of codes operable to cause the computer to generate a content presentation including a combination of the primary content and the reformatted one of the plurality of secondary content; and
- a seventh set of codes operable to cause the computer to display the content presentation such that the primary content is simultaneously displayed with the reformatted one of the plurality of secondary content within a viewable space on a display of the device, the reformatted one of the plurality of secondary content being displayed in a format different from that of the primary content,
- wherein the selecting of one of the plurality of secondary content is based on a user profile associated with the device, wherein the user profile includes static and dynamic information, and wherein the dynamic information includes a current position location information of the user and behavior information of the user related to the device.

11. A computer device, comprising:
- means for receiving a plurality of secondary content;
- means for selecting a primary content based on user input;
- means for selecting one of the plurality of secondary content when a secondary content state associated with the device comprises a value comprising an indication to include the secondary content, wherein the one of the plurality of secondary content is selected based on an algorithm operable to minimize a repeat presentation of the one of the plurality of secondary content;
- means for combining the selected one of the plurality of secondary content with the primary content, wherein the primary content comprises a marker defining a presentation attribute of the primary content and the secondary content;
- means for reformatting the one of the plurality of secondary content based on the marker by changing a content generation characteristic of the one of the plurality of secondary content, wherein the one of the plurality of secondary content is reformatted from a first content format to a second content format, and wherein the first content format corresponds to a first content display shape and the second content format corresponds to a second content display shape different from the first content display shape;
- means for generating a content presentation including a combination of the primary content and the reformatted one of the plurality of secondary content; and
- means for displaying the content presentation such that the primary content is simultaneously displayed with the reformatted one of the plurality of secondary content within a viewable space on a display of the device, the reformatted one of the plurality of secondary content being displayed in a format different from that of the primary content,
- wherein the means for selecting of one of the plurality of secondary content is based on a user profile associated with the device, wherein the user profile includes static and dynamic information, and wherein the dynamic information includes a current position location information of the user and behavior information of the user related to the device.

12. A computer device, comprising:
a device interface operable to receive a first user input;
a receiver operable to receive a plurality of secondary content from a communications network;
a memory comprising a media management module and a mixer or an aggregator module, wherein the memory is operable to store the plurality of secondary content;
a processor in communication with the device interface, the receiver and the memory, wherein the processor is operable to:
select a primary content based on the first user input;
select one of the plurality of secondary content when a secondary content state associated with the device comprises a value comprising an indication to include the secondary content, wherein the one of the plurality of secondary content is selected based on an algorithm operable to minimize a repeat presentation of the one of the plurality of secondary content;
combine the selected one of the plurality of secondary content with the primary content, wherein the primary content comprises a marker defining a presentation attribute of the primary content and the secondary content;
a reformat module operable to be initiated by the mixer or the aggregator module and operable to be executed by the processor to reformat the one of the plurality of secondary content based on the marker by changing a content generation characteristic of the one of the plurality of secondary content, wherein the one of the plurality of secondary content is reformatted from a first content format to a second content format, and wherein the first content format corresponds to a first content display shape and the second content format corresponds to a second content display shape different from the first content display shape;
wherein the mixer or the aggregator module is further operable to initiate generation of a content presentation including a combination of the primary content and the reformatted one of the plurality of secondary content; and
an output module operable to display the content presentation such that the primary content is simultaneously displayed with the reformatted one of the plurality of secondary content within a viewable space on a display of the device, the reformatted one of the plurality of secondary content being displayed in a format different from that of the primary content,
wherein the selecting of one of the plurality of secondary content is based on a user profile associated with the device, wherein the user profile includes static and dynamic information, and wherein the dynamic information includes a current position location information of the user and behavior information of the user related to the device.

13. The device of claim 12, wherein the reformat module is further operable to change at least one of a content size, a content shape, a content protocol, a content color characteristic, and a content sound characteristic.

14. The device of claim 12, wherein the reformat module is further operable to determine the second content display shape based on the marker.

15. The device of claim 12, further comprising a display operable to present the content presentation, wherein the reformat module is further operable to determine a placement of the one of the plurality of secondary content relative to the primary content on the display based on the marker.

16. The device of claim 12, wherein the one of the plurality of secondary content comprises an interactive element, further comprising a tracker module executable by the processor to track a second user input to the device interface in response to the interactive element in a user history, and wherein the mixer or the aggregator is further operable to select a next one of the plurality of secondary content based on the user history.

17. The device of claim 12, wherein the one of the plurality of secondary content comprises an interactive element, further comprising a tracker module executable by the processor to track a second user input to the device interface in response to the interactive element in a user history, wherein the media management module is further operable to forward the user history to another device, and wherein the communications module is further operable to receive an association of an item of value with the device based on the forwarded user history.

18. The device of claim 12, wherein the one of the plurality of secondary content comprises at least one of a coupon and an advertisement, and wherein the media management module is further operable to initiate storage of the one of the plurality of secondary content including the at least one of the coupon and the advertisement in the memory.

19. The device of claim 12, wherein the receiver is further operable to receive the plurality of secondary content from a communications network having a peak data rate of less than about 160 kilobits per second (kbps), and wherein each of the plurality of secondary content have a compressed format of less than about 64 kbps.

20. The method of claim 1, wherein the format corresponds to at least one of a content shape and a content size.

21. The device of claim 12, wherein the format corresponds to at least one of a content shape and a content size.

* * * * *